United States Patent
Moriyama et al.

(10) Patent No.: US 11,466,172 B2
(45) Date of Patent: Oct. 11, 2022

(54) INK-JET RECORDING LIQUID SET, PREPARATION METHOD OF PRETREATMENT LIQUID FOR INK-JET RECORDING, PRINTED MATTER, AND INK-JET RECORDING METHOD

(71) Applicant: Konica Minolta, Inc., Tokyo (JP)

(72) Inventors: Haruka Moriyama, Musashino (JP); Takayuki Toeda, Tokyo (JP); Hirotaka Tagori, Kawasaki (JP)

(73) Assignee: KONICA MINOLTA, INC., Tokyo (JP)

(*) Notice: Subject to any disclaimer, the term of this patent is extended or adjusted under 35 U.S.C. 154(b) by 627 days.

(21) Appl. No.: 16/560,203

(22) Filed: Sep. 4, 2019

(65) Prior Publication Data

US 2020/0115580 A1 Apr. 16, 2020

(30) Foreign Application Priority Data

Oct. 11, 2018 (JP) .............................. JP2018-192219

(51) Int. Cl.
   - *C09D 11/54* (2014.01)
   - *C09D 11/322* (2014.01)
   - *C08L 75/00* (2006.01)
   - *C08L 83/14* (2006.01)

(52) U.S. Cl.
   CPC .............. *C09D 11/54* (2013.01); *C08L 75/00* (2013.01); *C08L 83/14* (2013.01); *C09D 11/322* (2013.01)

(58) Field of Classification Search
   CPC ... B41M 5/0017; B41M 5/0047; C09D 11/02; C09D 11/037; C09D 11/322; C09D 11/38; C09D 11/40; C09D 11/54; C09D 175/04; C08L 75/00
   See application file for complete search history.

(56) References Cited

U.S. PATENT DOCUMENTS

| | | | |
|---|---|---|---|
| 2015/0077480 A1* | 3/2015 | Fujii | ............... C09D 11/40 106/31.86 |
| 2015/0079358 A1* | 3/2015 | Gotou | ............. C09D 125/14 106/31.78 |

FOREIGN PATENT DOCUMENTS

| | | | |
|---|---|---|---|
| JP | 2009202596 A | 9/2009 | |
| JP | 103963462 | * 8/2014 | ......... B41M 5/0017 |
| JP | 2018044074 A | 3/2018 | |
| JP | 2018094902 A | 6/2018 | |
| JP | 2018-127521 A | 8/2018 | |
| WO | 2017/069077 A1 | 4/2017 | |

OTHER PUBLICATIONS

JPO, Notice of the Reasons for Rejection for the corresponding Japanese Patent Application No. 2018-192219, dated Jun. 28, 2022, with English translation.

\* cited by examiner

*Primary Examiner* — Anh T Vo
(74) *Attorney, Agent, or Firm* — Lucas & Mercanti, LLP

(57) ABSTRACT

Provided is an ink-jet recording liquid set including a pretreatment liquid for ink-jet recording and an ink-jet ink, wherein the pretreatment liquid for ink-jet recording includes: composite resin particles in which a polyolefin resin is contained in a polyurethane resin; a coagulant; and water, and the ink-jet ink contains: a pigment; water; and 3-methoxy-1-butanol or 3-methoxy-3-methy-1-butanol.

17 Claims, 1 Drawing Sheet

INK-JET RECORDING LIQUID SET, PREPARATION METHOD OF PRETREATMENT LIQUID FOR INK-JET RECORDING, PRINTED MATTER, AND INK-JET RECORDING METHOD

Japanese Patent Application No. 2018-192219, filed on Oct. 11, 2018 with Japan Patent Office, is incorporated herein by reference in its entirety.

BACKGROUND

1. Technological Field

The present invention relates to an ink-jet recording liquid set, a preparation method of a pretreatment liquid for ink-jet recording, a printed matter, and an ink-jet recording method. More specifically, the present invention relates to an ink-jet recording liquid set capable of producing a high quality ink-jet image excellent in image quality, water resistance, image fixability and quick drying property at high speed printing on a non-absorptive substrate, a preparation method of a pretreatment liquid for ink-jet recording, a printed matter, and an ink-jet recording method.

2. Description of the Related Art

In the printing field, printing methods using ink-jet have been developed and are widely put to practical use. When printing using an ink-jet ink and an ink-jet printer, the ink ejected from the ink-jet head lands on a recording medium, then penetrates and is fixed to form dots. An image is formed by gathering a large number of the dots. The formation process of this dot is important in forming a clear image.

As the recording medium, various media such as uncoated paper, coated paper, stretched polypropylene resin, polyester resin, vinyl chloride resin and nylon are used.

Among them, when a non-absorptive substrate such as a resin is used as the recording medium, since the substrate itself has little ability to absorb ink, the ejected ink droplets, for example, remain on the surface of the hydrophobic substrate. Therefore, it is difficult to uniformly apply the ink containing the coloring material to the surface of the substrate, there are problems that image unevenness occurs and the fixability of the coloring material in the ejected ink to the substrate is also likely to decrease. In addition, when high-speed printing is performed, the drying property is also a big problem when an aqueous ink-jet ink is used.

In order to solve such problems, Patent Document 1 (JP-A 2018-44074) discloses an aqueous ink-jet ink used for printing on a non-absorptive substrate, specifically a polyvinyl chloride substrate. It is disclosed that quick drying, water resistance and image quality are improved in printing on polyvinyl chloride substrate by the aqueous ink-jet ink containing 3-methoxy-1-butanol as a water-soluble organic solvent component together with resin particles. However, it has been found that, with the above-described proposed ink-jet ink, the image quality obtained when performing ink-jet printing at high speed is low, and the ejection stability from the ink-jet head is also poor.

Further, Patent Document 2 (JP-A 2018-94902) discloses an image forming method in which the lamination strength, the image density, the abrasion resistance of the image area are improved by forming an image with an ink on a non-absorptive film substrate provided with a liquid composition as a pretreatment liquid containing nonionic resin particles and a polyvalent metal salt. It has been found that the images formed in this way have problems with image fixability and water resistance to non-absorptive film substrates.

Further, Patent Document 3 (JP-A 2009-202596) discloses an ink-jet recording method in which an ink composition containing 3-nethhoxy-3-methyl-1-butanol is applied to form an image, after applying a pretreatment liquid containing a polyvalent metal salt and 3-methoxy-3-methyl-1-butanol to an absorptive substrate (plain paper). According to this method, it is believed that an image excellent in quick drying can be obtained, but when this ink-jet recording method is applied to a non-absorptive substrate, the image fixability and water resistance are insufficient. It turned out that it is not suitable for non-absorptive substrates.

Therefore, development of an ink-jet recording method capable of producing a high quality ink-jet image excellent in image quality, water resistance, image fixability and quick drying property at the time of high speed printing to a non-absorptive substrate is desired.

SUMMARY

The present invention has been made in view of the above problems and circumstances. An object of the present invention is to provide an ink-jet recording liquid set capable of producing a high quality ink-jet image excellent in image quality, water resistance, image fixability and quick drying property at high speed printing on a non-absorptive substrate, a preparation method of a pretreatment liquid for ink-jet recording, a printed matter, and an ink-jet recording method.

In order to solve the above problems, an ink-jet recording liquid set that reflects an aspect of the present invention comprises a pretreatment liquid for ink-jet recording and an ink-jet ink, wherein the pretreatment liquid for ink-jet recording includes: composite resin particles in which a polyolefin resin is contained in a polyurethane resin; a coagulant; and water, and the ink jet ink contains: a pigment; water; and 3-methoxy-1-butanol or 3-methoxy-3-methy-1-butanol.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Figure 1:
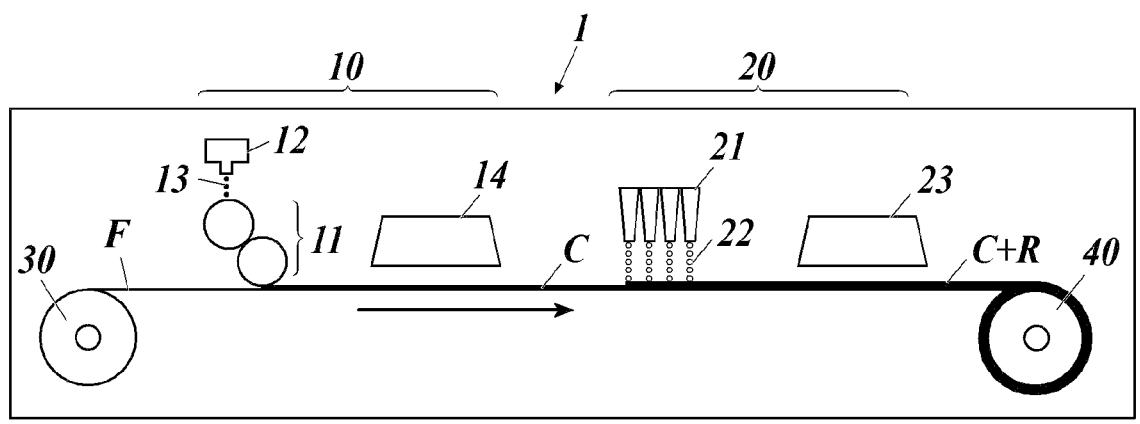
FIG. 1 is a schematic view indicating an example of a constitution of an ink-jet recording apparatus having a pretreatment liquid applying means applicable to the ink-jet recording method of the present invention.

Hereinafter, one or more embodiments of the present invention will be described with reference to the drawings. However, the scope of the invention is not limited to the disclosed embodiments.

An ink-jet recording liquid set of the present invention comprises a pretreatment liquid for ink-jet recording and an ink-jet ink, wherein the ink-jet ink contains: a pigment;

water; and 3-methoxy-1-butanol or 3-methoxy-3-methy-1-butanol, and the pretreatment liquid for ink-jet recording includes: composite resin particles in which a polyolefin resin is contained in a polyurethane resin; a coagulant; and water. This feature is a technical feature common or corresponding to the following embodiments.

According to the present invention, it is possible to provide an ink-jet recording liquid set capable of producing a high quality ink-jet image excellent in image quality, water resistance, image fixability and quick drying property at high speed printing on a non-absorptive substrate, a preparation method of a pretreatment liquid for ink-jet recording, a printed matter, and an ink-jet recording method.

By using an ink-jet recording liquid set comprising a pretreatment liquid for ink-jet recording (hereafter, it is also simply called as "a pretreatment liquid") specified in the present invention and an ink-jet ink (hereafter, it is also simply called as "an ink" or "an ink liquid"), a preparation method of a pretreatment liquid for ink-jet recording, a printed matter, and an ink-jet recording method, it was possible to produce an image excellent in water resistance, image quality at high-speed printing, image fixability to non-absorptive substrate, and quick drying property The expression mechanism and the action mechanism of the effect are estimated as follows.

(About Improvement of Image Quality at High-Speed Printing)

In the past, it has been known that bleeding of the ink on the substrate can be prevented by containing a coagulant in the pretreatment liquid to aggregate a coloring material component (pigment particles) in the ink. However, when it is intended to provide high-speed printability, which is one of the technical problems to be solved in the present invention, the above configuration has a problem that the quality of the formed image is degraded due to the occurrence of white spots and bleeding.

For the above problem, by incorporating 3-methoxy-1-butanol or 3-methoxy-3-methyl-1-butanol as a water-soluble organic solvent according to the present invention into the ink, the dissolution rate of the coagulant contained in the pretreatment layer in the water-soluble organic solvent into the ink is improved, and the coloring material component can be coagulated quickly. Therefore, it is presumed that good image quality can be obtained even in high-speed printing.

Further, since 3-methoxy-1-butanol or 3-methoxy-3-methyl-1-butanol according to the present invention has a short main chain alkyl group and has a branched structure, it has moderately hydrophobic property. Therefore, the wettability of the ink on the pretreatment layer formed of the composite resin particles containing the relatively hydrophobic olefin resin component according to the present invention is improved, it is presumed that no white spots occur even in high speed printing and a uniform image can be obtained.

(About Image Fixability to Non-Absorptive Substrate)

Heretofore, polyester-based, polyurethane-based and polyolefin-based resin fine particles have been mainly used for the purpose of improving the image adhesion to a non-absorptive substrate. However, in a system using a pretreatment liquid containing such resin particles and a coagulant, there is a problem regarding the fixing property of the image (hereinafter also referred to as adhesion or adhesiveness). This is because the coagulant present on the surface of the pretreatment layer formed on the non-absorptive substrate is a low molecular weight, and it is presumed that there is some hindrance to the adhesion to the image layer formed by the ink. On the other hand, by applying 3-methoxy-1-butanol or 3-methoxy-3-methyl-1-butanol according to the present invention to the ink liquid, when the ink liquid contacts the pretreatment layer, the coagulant present on the surface of the pretreatment layer diffuses into the ink and the coagulant does not stagnate on the surface of the pretreatment layer. From this, it is presumed that the adhesion between the image layer and the pretreatment layer is good.

In addition, when the composite resin particle defined in the present invention and 3-methoxy-1-butanol or 3-methoxy-3-methyl-1-butanol are combined, 3-methoxy-1-butanol or 3-methoxy-3-methyl-1-butanol comes in contact with the pretreatment layer, the composite resin particle coating film constituting the pretreatment layer surface is appropriately plasticized, and part of the image layer component is on the pretreatment layer surface. It is believed to melt and fuse. As a result, it is presumed that the adhesion is improved.

In addition, by applying composite resin particles in which a polyolefin resin is contained in a polyurethane resin, the urethane site improves the adhesion to a non-absorptive substrate, for example, a high polar substrate such as PET. The olefin site contributes to the improvement of the adhesion to the low polar substrate.

These effects make the adhesion of the interface between the non-absorptive substrate and the pretreatment layer stronger, and make the adhesion between the pretreatment layer containing the coagulant and the image layer stronger. It is assumed that that the image fixability is improved.

(About Water Resistance)

By using the ink-jet recording liquid set of the present invention, the water resistance is also improved.

By using the composite resin particles according to the present invention, it is estimated that the pretreatment layer formed on the non-absorptive substrate forms a sea-island structure. In the present invention, the combination of the composite resin particles and the coagulant makes the coagulant compatible with the sea portion of the sea-island structure. This enhances the interaction between particles of the composite resin particles at the time of film formation, and makes it possible to form a strong pretreatment layer even with a pretreatment layer containing a coagulant. From this, it is presumed that the water resistance is improved since the coating film structure in which water does not easily enter into the pretreatment layer is obtained.

Further, relatively low molecular weight and moderately hydrophobic 3-methoxy-1-butanol or 3-methoxy-3-methyl-1-butanol makes the above-mentioned coagulant easy to be incorporated into the ink. In addition, it is assumed that these solvents are suitably plasticizing the pigment dispersant present around the pigment particles. From this, when the ink is dried, in the process where the pigment particles and the dispersing agent fuse, the coagulant is trapped in the structure composed of the pigment particles and the dispersing agent, and the pigment particles and the dispersing agent form no gaps to result in forming an image layer. Thereby, the coagulant having a function of reducing the water resistance and having high hydrophilicity is sealed. As a result, it becomes less susceptible to the influence of water, and the swelling of the whole coating film is suppressed. It is estimated that water resistance has improved by this.

As an embodiment of the present invention, in the composite resin particles according to the present invention, at least a polyolefin resin is contained in a polyurethane resin. More preferably, they are composite resin particles in which a polyolefin resin is emulsified in a polyurethane resin. The composite resin particles in which a polyolefin resin is contained in a polyurethane resin are in a state where the polyurethane resin and polyolefin resin which are originally low in interaction strongly interact. In addition, when the pretreatment layer is formed into a film by the composite resin particles, the highly compatible polyurethane resin particles are fused to form a fine sea-island structure. As a result, the polyolefin resin capable of interacting with the low polarity polypropylene substrate, the highly polar polyethylene terephthalate substrate and the polyurethane resin capable of interacting with the coloring material are firmly fixed on the substrate. Therefore, image adhesion to a polyolefin substrate and to a polyethylene terephthalate substrate each having a different polarity may be improved.

As an embodiment of the present invention, from the viewpoint of exhibiting the effects of the present invention, when the value of the mass ratio (U/O) of the polyurethane resin (U) to the polyolefin resin (O) in the composite resin particles is in the range of 40/60 to 95/5, the effect of improving the interaction between the composite resin particles and the colorant is exhibited while enhancing the interaction with the non-absorptive substrate, and the image adhesion may be improved. In addition, when the proportion of the polyolefin resin is within the above range, it is preferable in the point of having excellent in water resistance. In addition, by setting the mass ratio within the above range, it is possible to prevent the ink solvent from penetrating to the deep part of the pretreatment layer, which is preferable from the viewpoint of improving the quick drying property.

The polyol component in the polyurethane resin preferably has a carbonate group or an ether bond in the molecule. When the polyol component has a carbonate group or an ether bond in the molecule, hydrolysis is less likely to occur, and thus the water resistance is excellent.

When the content of 3-methoxy-1-butanol or 3-methoxy-3-methyl-butanol is in the range of 5.0 to 30 mass % with respect to the total mass of the ink-jet ink, it is preferable in that the effect of excellent quick drying may be exhibited, the wettability to the pretreatment layer may be secured, and the fixability and the image quality may be further improved.

The coagulant is preferably a polyvalent metal salt or an organic acid. For example, in the case of a coagulant such as a cationic polymer, the aggregating power is weak and the wetting spreads too much, so it is considered that adjacent dots overlap to lead to deterioration of the image quality. By using a coagulant having a strong aggregating ability, such as an organic acid or a polyvalent metal salt, it is considered that the balance between the aggregation and the wettability becomes good, and the image quality and the water resistance are improved.

Moreover, it is preferable that the ink-jet ink contains a silicone surfactant which has a structure represented by Formula (1) as a surfactant. This silicone surfactant is easily oriented to a liquid surface quickly, and has an effect of greatly reducing the dynamic surface tension. Therefore, the coating property of the ink-jet ink on the pretreatment layer may be remarkably improved, and the image quality of the image layer to be formed may be improved.

Further, a preparation method of a pretreatment liquid for ink-jet recording of the present invention contains the steps of: emulsifying and dispersing a polyolefin resin and a polyurethane resin to form composite resin particles; and mixing the composite resin particles and a coagulant.

In addition, a printed matter of the present invention has a pretreatment layer and an image layer formed on a non-absorptive substrate using the ink-jet recording liquid set of the present invention.

The ink-jet recording method of the present invention is a method of forming an image using a pretreatment liquid for inkjet recording and an ink-jet ink. This method contains the step of: forming a pretreatment layer by applying a pretreatment liquid for ink-jet recording on a non-absorptive substrate using an ink-jet recording liquid set of the present invention; and forming an image layer on the formed pretreatment layer using the ink-jet ink. Thus an image is formed.

The present invention and the constitution elements thereof, as well as configurations and embodiments, will be detailed in the following. In the present description, when two figures are used to indicate a range of value before and after "to", these figures are included in the range as a lowest limit value and an upper limit value.

[Ink-Jet Recording Liquid Set]

The ink-jet recording liquid set of the present invention comprises a pretreatment liquid for ink-jet recording and an ink-jet ink. The ink-jet ink contains a pigment, water, and 3-methoxy-1-butanol or 3-methoxy-3-methyl-1-butanol. And, the pretreatment liquid for ink-jet recording contains at least composite resin particles obtained by containing a polyolefin resin in a polyurethane resin, an aggregating agent, and water.

Hereinafter, details of each component of the pretreatment liquid for ink-jet recording and the ink-jet ink constituting the ink-jet recording liquid set of the present invention will be described.

<<Ink-Jet Ink>>

The ink-jet ink according to the present invention comprises at least a pigment, water, and 3-methoxy-1-butanol or 3-methoxy-3-methyl-1-butanol.

[Pigment]

As the pigment contained in the ink-jet ink according to the present invention, it is possible to use an anionic dispersing pigment, for example, an anionic self-dispersing pigment or a pigment dispersed with an anionic polymer dispersing agent. In particular, one in which the pigment is dispersed by an anionic polymer dispersant is preferable.

As the pigment, conventionally known pigments may be used without particular limitation, and, for example, organic pigments such as insoluble pigments and lake pigments, and inorganic pigments such as titanium oxide may be preferably used.

The insoluble pigment is not limited. Preferable examples of the insoluble pigment are: azo, azomethine, methine, diphenylmethane, triphenylmethane, quinacridone, anthraquinone, perylene, indigo, quinophthalone, isoindolinone, isoindoline, azine, oxazine, thiazine, Dioxazine, thiazole, phthalocyanine, and diketopyrrolopyrrole pigments.

Specific organic pigments that may be preferably used include the following pigments.

Examples of a magenta or red pigment are: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48: 1, C.I. Pigment Red 53: 1, C.I. Pigment Red 57: 1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 202, C.I. Pigment Red 222, and C.I. Pigment Violet 19.

Examples of an orange or yellow pigment are: C.I. Pigment Orange 31, C.I. Pigment Orange 43, C.I. Pigment Yellow 12, C.I. Pigment Yellow 13, C.I. Pigment yellow 14, C.I. Pigment Yellow 15, C.I. Pigment Yellow 15: 3, C.I. Pigment Yellow 17, C.I. Pigment Yellow 74, C.I. Pigment Yellow 93, C.I. Pigment Yellow 128, C.I. Pigment Yellow 94, C.I. Pigment Yellow 138, and C.I. Pigment Yellow 155. In particular, in view of the balance of color tone and light resistance, C.I. Pigment Yellow 155 is preferred.

Examples of a green or cyan pigment are: C.I. Pigment Blue 15, C.I. Pigment Blue 15: 2, C.I. Pigment Blue 15:3, C.I. Pigment Blue 16, C.I. Pigment Blue 60, and C.I. Pigment Green 7.

Examples of a black pigment are: C.I. Pigment Black 1, C.I. Pigment Black 6, and C.I. Pigment Black 7.

(Pigment Dispersant)

The pigment dispersant used to disperse the pigment is not particularly limited, and it is preferably a polymer dispersant having an anionic group, and those having a molecular weight in the range of 5,000 to 200,000 may be suitably used.

Examples of the polymer dispersant are: styrene, styrene derivatives, vinyl naphthalene derivatives, acrylic acid, acrylic acid derivatives, maleic acid, maleic acid derivatives, itaconic acid, itaconic acid derivatives, fumaric acid, block copolymers having a structure derived from two or more monomers selected from fumaric acid derivatives, random copolymers and salts thereof, polyoxyalkylenes, and polyoxyalkylene alkyl ethers.

The polymer dispersant preferably has an acryloyl group, and is preferably neutralized with a neutralizing base and added. The neutralizing base is not particularly limited, and it is preferably an organic base such as ammonia, monoethanolamine, diethanolamine, triethanolamine or morpholine. In particular, when the pigment is titanium oxide, the titanium oxide is preferably dispersed by a polymer dispersant having an acryloyl group.

The addition amount of the polymer dispersant is preferably in the range of 10 to 100 mass %, and more preferably in the range of 10 to 40 mass % with respect to the pigment.

It is particularly preferred that the pigment is in the form of a so-called capsule pigment, in which the pigment is coated with the above-mentioned polymeric dispersant. Various known methods may be used to coat the pigment with the polymer dispersant. For example, a phase inversion emulsification method, an acid precipitation method, or a method of dispersing a pigment with a polymerizable surfactant is performed, then, supplying a monomer thereto, and coating while polymerizing may be preferably exemplified.

Particularly preferable method is a follows: a water insoluble resin is dissolved in an organic solvent such as methyl ethyl ketone, and the acid group in the resin is partially or completely neutralized with a base; then, a pigment and ion-exchange water is added and the mixture is dispersed; thereafter, the organic solvent is removed and water is added according to necessity.

The average particle diameter of the pigment in the ink-jet ink in the dispersed state is preferably in the range of 50 to 200 nm. Thereby, the dispersion stability of the pigment may be improved, and the storage stability of the ink may be improved.

The particle size of the pigment may be measured by a commercially available particle size measuring instrument using a dynamic light scattering method or an electrophoresis method. The measurement by the dynamic light scattering method is simple, and the particle diameter range may be measured accurately.

(Dispersion Method of Pigment)

The pigment may be used after being dispersed with a disperser together with a dispersant and other necessary additives depending on the desired purposes.

As a dispersing machine, a ball mill, a sand mill, a line mill, and a high pressure homogenizer, which are conventionally known, may be used. Among them, dispersing the pigment by a sand mill is preferable because the particle size distribution becomes sharp. The material of the beads used for sand mill dispersion is not particularly limited, and it is preferably zirconia or zircon from the viewpoint of preventing formation of bead fragments and contamination of ionic components. Furthermore, the bead diameter is preferably in the range of 0.3 to 3 mm.

The content of the pigment in the ink-jet ink is not particularly limited, and a range of 7 to 18 mass % is preferable for titanium oxide, and a range of 0.5 to 7 mass % is preferable for an organic pigment.

[Water-Soluble Organic Solvent]

The "water-soluble organic solvent" in the present invention refers to an organic solvent having a solubility of at least 500 g/L at 20° C. in water. As a water-soluble organic solvent, it is preferably an organic solvent which is uniformly mixed with water at an arbitrary ratio at 20° C.

In the ink-jet ink according to the present invention, at least 3-methoxy-1-butanol or 3-methoxy-3-methyl-1-butanol is contained as a water-soluble organic solvent.

By applying 3-methoxy-1-butanol or 3-methoxy-3-methyl-1-butanol in the ink-jet ink according to the present invention, as described above, good image quality may be obtained even in high-speed printing. Further, by forming an image on a non-absorptive substrate using the ink-jet recording liquid set of the present invention, when the ink comes in contact with the pretreatment layer, the coagulant present on the surface of the pretreatment layer diffuses into the ink, and the coagulant does not stagnate on the surface of the pretreatment layer. From this, it is possible to improve the adhesion of the interface between the non-absorptive substrate and the pretreatment layer, or the interface between the pretreatment layer containing a coagulant and the image layer. Further, the coagulant may be easily incorporated into the ink by using relatively low molecular weight and appropriately hydrophobic 3-methoxy-1-butanol or 3-methoxy-3-methyl-1-butanol. These solvents moderately plasticize the pigment dispersant present around the pigment particles. When the ink is dried, in the process where the pigment particles and the dispersing agent fuse, the coagulant is trapped in the structure composed of the pigment particles and the dispersing agent, and the pigment particles and the dispersing agent form no gaps to result in forming a layer. Thereby, water resistivity is improved.

The content of 3-methoxy-1-butanol or 3-methoxy-3-methyl-1-butanol in the ink-jet ink according to the present invention is preferably in the range of 5.0 to 30 mass % with respect to the total mass of the ink-jet ink. When the content is 5.0 mass % or more, the above effects may be exhibited, and when it is 30 mass % or less, the liquid physical properties (for example, ink viscosity) of the ink-jet ink are not impaired, and at the time of image formation injection stability may be maintained.

In the ink-jet ink according to the present invention, known water-soluble organic solvents may be used as long as the object effects of the present invention are not impaired. Examples of the water-soluble organic solvent which may be co-used are: alcohols, polyhydric alcohols, amines, amides, glycol ethers, and 1,2-alkanediols having 4 or more carbon atoms.

Examples of the alcohol are: methanol, ethanol, propanol, isopropanol, butanol, isobutanol, secondary butanol, and tertiary butanol.

Examples of the polyhydric alcohol are: ethylene glycol, diethylene glycol, triethylene glycol, tetraethylene glycol, polyethylene glycol having 5 or more ethylene oxide groups, propylene glycol, dipropylene glycol, tripropylene glycol, polypropylene glycol having 4 or more propylene oxide groups, butylene glycol, hexanediol, pentanediol, glycerin, hexanetriol, and thiodiglycol.

Examples of the amine are: ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine.

Examples of the amide are: formamide, N,N-dimethylformamide, and N,N-dimethylacetamide.

Examples of the glycol ether are: ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, and tripropylene glycol monomethyl ether.

Examples of the 1,2-alkanediol having 4 or more carbon atoms are: 1,2-butanediol, 1,2-pentanediol, 1,2-hexanediol, and 1,2-heptanediol.

The content of the organic solvent in the ink is not particularly limited. It is preferably in the range of 10 to 60 mass %.

[Silicone Surfactant]

In the ink-jet ink according to the present invention, it is preferable to incorporate, as a surfactant, a silicone surfactant having a structure represented by the following Formula (1).

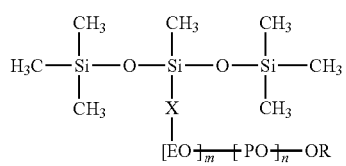

Formula (1)

In Formula (1), R represents a hydrogen atom or a hydrocarbon group having 1 to 4 carbon atoms. X represents an alkylene group having 2 to 6 carbon atoms, and may have a branched structure. EO represents a repeating unit structure of polyethylene oxide. PO represents a repeating unit structure of polypropylene oxide. $[EO]_m$ and $[PO]_n$ may have any order. n and m each represent a number of repeating unit structure, m is an integer of 2 to 50, and n is an integer of 0 to 20.

In the present invention, "EO" represents a repeating unit structure of polyethylene oxide, that is, a structure in which ethylene oxide, which is a three-membered cyclic ether, is opened. Also, "PO" represents the repeating unit structure of polypropylene oxide, that is, a structure in which propylene oxide, which is a three-membered cyclic ether, is opened.

Here, "$[EO]_m$ and $[PO]_n$ may have any order" means that in the compound having a structure represented by Formula (1), the order of the bonding position to the parent siloxane skeleton is appropriately changed among $[EO]_m$ and $[PO]_n$.

In Formula (1), R is preferably a hydrogen atom, a methyl group, an ethyl group, a propyl group or a butyl group, and more preferably a hydrogen atom or a methyl group.

Moreover, in Formula (1), it is preferable that X is an alkylene group having 3 carbon atoms (namely, propylene group).

In Formula (1), it is preferable that m is an integer of 5 to 20 and n is an integer of 0 to 6.

Although S-1 to S-8 are indicated below as specific examples of the silicone surfactant having the structure represented by Formula (1), the present invention is not limited thereto.

(S-1): in Formula (1), R=methyl group, X=alkylene group having 3 carbon atoms, m=9, n=0

(S-2): in Formula (1), R=butyl group, X=alkylene group having 3 carbon atoms, m=25, n=6

(S-3): in Formula (1), R=hydrogen atom, X=alkylene group having 3 carbon atoms, m=3, n=0

(S-4): in Formula (1), R=hydrogen atom, X=alkylene group having 3 carbon atoms, m=33, n=0

(S-5): in Formula (1), R=hydrogen atom, X=alkylene group having 3 carbon atoms, m=22, n=16

(S-6): in Formula (1), R=hydrogen atom, X=alkylene group having 3 carbon atoms, m=9, n=0

(S-7): in Formula (1), R=hydrogen atom, X=alkylene group having 3 carbon atoms, m=12, n=3

(S-8): in Formula (1), R=hydrogen atom, X=alkylene group having 3 carbon atoms, m=1, n=0

The silicone surfactant having the structure represented by Formula (1) is excellent in storage stability and effective when it is contained in the range of 0.1 to 3 mass % with respect to the entire ink. This is preferable in that it is possible to impart good ink wettability.

The synthetic method of the silicone surfactant S-1 to S-8 described above according to the present invention is indicated below.

(Synthetic Example of Surfactant S-1)

In a five-necked flask equipped with a stirrer, reflux condenser, dropping funnel, thermometer and nitrogen bubbler were loaded 450 mass parts of allylated polyether (UNIOX PKA-5008, manufactured by NOF Corporation), and 0.01 mass parts of $H_2Pt_{16}·6H_2O$ hexachloroplatinum (IV) acid hexahydrate (manufactured by Tokyo Chemical Industry Co., Ltd.). Nitrogen gas substitution was performed. The reaction vessel was heated to 70° C. and 220 mass parts of heptamethyltrisiloxane (manufactured by Aldrich Co.) was dropped over 1 hour, and then the reaction vessel was heated to 110° C. and reacted for 4 hours. After the reaction, unreacted material was distilled off under a reduced pressure to obtain silicone surfactant S-1, which is a target silicone surfactant. The obtained silicone surfactant S-1 is a silicone surfactant corresponding to R=a methyl group, X=an alkylene group having 3 carbon atoms, m=9, and n=0 in Formula (1).

(Synthetic Example of Surfactant S-2)

A silicone surfactant S-2 was obtained by the same method as the synthetic example of the surfactant S-1, except that 1600 mass parts of allylated polyether (UNISAFE PKA-5015 manufactured by NOF Corporation) were used instead of 450 mass parts of allylated polyether (UNIOX PKA-5008 manufactured by NOF Corporation). The obtained silicone surfactant S-2 is a silicone surfactant corresponding to R=a butyl group, X=an alkylene group having 3 carbon atoms, m=25, and n=6 in Formula (1).

(Synthetic Example of Surfactant S-3)

A silicone surfactant S-3 was obtained by the same method as the synthetic example of the surfactant S-1, except that 200 mass parts of allylated polyether (UNIOX PKA-5001 manufactured by NOF Corporation) were used instead of 450 mass parts of allylated polyether (UNIOX PKA-5008 manufactured by NOF Corporation). The obtained silicone surfactant S-3 is a silicone surfactant corresponding to R=a hydrogen atom, X=an alkylene group having 3 carbon atoms, m=3, and n=0 in Formula (1).

(Synthetic Example of Surfactant S-4)

A silicone surfactant S-4 was obtained by the same method as the synthetic example of the surfactant S-1, except that 1500 mass parts of allylated polyether (UNIOX PKA-5005 manufactured by NOF Corporation) were used instead of 450 mass parts of allylated polyether (UNIOX PKA-5008 manufactured by NOF Corporation). The obtained silicone surfactant S-4 is a silicone surfactant corresponding to R=a hydrogen atom, X=an alkylene group having 3 carbon atoms, m=33, and n=0 in Formula (1).

(Synthetic Example of Surfactant S-5)

A silicone surfactant S-5 was obtained by the same method as the synthetic example of the surfactant S-1, except that 2000 mass parts of allylated polyether (UNI-LUBE PKA-5013 manufactured by NOF Corporation) were used instead of 450 mass parts of allylated polyether (UNIOX PKA-5008 manufactured by NOF Corporation). The obtained silicone surfactant S-5 is a silicone surfactant corresponding to R=a hydrogen atom, X=an alkylene group having 3 carbon atoms, m=22, and n=16 in Formula (1).

(Synthetic Example of Surfactant S-6)

A silicone surfactant S-6 was obtained by the same method as the synthetic example of the surfactant S-1, except that 450 mass parts of allylated polyether (UNIOX PKA-5003 manufactured by NOF Corporation) were used instead of 450 mass parts of allylated polyether (UNIOX PKA-5008 manufactured by NOF Corporation). The obtained silicone surfactant S-6 is a silicone surfactant corresponding to R=a hydrogen atom, X=an alkylene group having 3 carbon atoms, m=9, and n=0 in Formula (1).

(Synthetic Example of Surfactant S-7)

A silicone surfactant S-7 was obtained by the same method as the synthetic example of the surfactant S-1, except that 750 mass parts of allylated polyether (UNISAFE PKA-5011 manufactured by NOF Corporation) were used instead of 450 mass parts of allylated polyether (UNIOX PKA-5008 manufactured by NOF Corporation). The obtained silicone surfactant S-7 is a silicone surfactant corresponding to R=a hydrogen atom, X=an alkylene group having 3 carbon atoms, m=12, and n=3 in Formula (1).

(Synthetic Example of Surfactant S-8)

A silicone surfactant S-8 was obtained by the same method as the synthetic example of the surfactant S-1, except that 105 mass parts of ethylene glycol monoallyl ether (manufactured by Tokyo Chemical Industry Co., Ltd.) were used instead of 450 mass parts of allylated polyether (UNIOX PKA-5008 manufactured by NOF Corporation). The obtained silicone surfactant S-8 is a silicone surfactant corresponding to R=a hydrogen atom, X=an alkylene group having 3 carbon atoms, m=1, and n=0 in Formula (1).

[Water and Other Additives]

The water contained in the ink-jet ink according to the present invention is not particularly limited, and ion-exchanged water, distilled water, or pure water may be used.

The ink according to the present invention may also contain a conventionally known surfactant in addition to the silicone surfactant having the structure represented by Formula (1). As a result, it is possible to improve the ink ejection stability and to control the spread (dot diameter) of the droplets that have landed on the non-absorptive substrate and the pretreatment layer.

The surface tension of the ink according to the present invention is preferably 35 mN/m or less, and more preferably 30 mN/m or less.

The surfactant that can be used in the ink according to the present invention may be used without particular limitation, but when the other components of the ink contain an anionic compound, a preferable ionic property of the surfactant is an anion, nonionic or betaine type.

In the present invention, the surfactant preferably used are: a fluorine-based surfactant having a high ability to reduce static surface tension, an anionic surfactant such as dioctyl sulfosuccinate having a high ability to reduce dynamic surface tension, relatively low molecular weight polyoxyethylene nonionic surfactants such as alkyl ethers, polyoxyethylene alkylphenyl ethers, acetylene glycols, pluronic surfactants, and sorbitan derivatives. It is also preferable to use a combination of a fluorine-based surfactant and a surfactant having a high ability to reduce dynamic surface tension.

The content of the surfactant in the ink is not particularly limited, and it is preferably in the range of 0.1 to 5.0 mass %.

In the ink used in the present invention, in addition to those described above, according to the purpose of improving the ejection stability, print head and ink cartridge compatibility, storage stability, image storability, and other various performances, as necessary, various additives known in the art may be used. Examples thereof are: polysaccharides, viscosity modifiers, resistivity modifiers, film-forming agents, UV absorbers, antioxidants, anti-fading agents, anti-glare agents, and anti-rust agents. They are appropriately selected and used. Specific examples are: oil droplets made of such as liquid paraffin, dioctyl phthalate, tricresyl phosphate, and silicone oil; UV absorbers described in JP-A 57-74193, JP-A 57-87988, and JP-A 62-261476; antifading agents described in JP-A 57-74192, JP-A 57-87989, JP-A 60-72785, JP-A 61-146591, JP-A 1-95091 and JP-A 3-13376; fluorescent whitening agents described in JP-A 59-42993, JP-A 59-52689, JP-A 62-280069, JP-A 61-242871, and JP-A 4-219266.

The viscosity of the ink used in the present invention having the above constitution is preferably in the range of 1 to 40 mPa·s at 25° C., and more preferably in the range of 2 to 10 mPa·s.

<<Pretreatment Liquid for Ink-Jet Recording>>

The pretreatment liquid for ink-jet recording according to the present invention contains at least a composite resin particles containing a polyolefin resin in a polyurethane resin, an aggregating agent, and water.

[Composite Resin Particles]

The composite resin particles according to the present invention are particles in which a polyolefin resin is contained in a polyurethane resin, and it is a preferable embodiment that the polyolefin resin is emulsified in the polyurethane resin which has the hydrophilic group, and made to be a composite resin.

That is, in the composite resin particles, the polyurethane resin is present at the interface between the polyolefin resin as the water insoluble resin and water as the continuous phase, and functions as a water insoluble resin layer different from the resin protecting the water insoluble resin. Thus by forming composite resin particles obtained by emulsifying a polyolefin resin with a polyurethane resin, it is possible to suppress the decrease in the compatibility with the polyurethane resin, the coagulant and the crosslinking agent in the case of the polyolefin resin alone. In addition, by emulsifying each of the polyolefin resin and the polyurethane resin, the physical properties of the coating film may be improved as compared with the case of simply mixing the both, and the stability of the pretreatment liquid according to the present invention may be improved.

The mass ratio value (U/O) of the polyurethane resin (U) to the polyolefin resin (O) in the composite resin particles is preferably in the range of 40/60 to 95/5, more preferably in the range of 40/60 to 80/20. When the proportion of the polyurethane resin is in the above range, the compatibility with the dispersant tends to be improved, and the solvent resistance is also excellent. Moreover, it is excellent in the adhesiveness with respect to a polyolefin film base material when the proportion of the polyolefin resin is in the above-described range.

The composite resin particles according to the present invention are preferably contained in the range of 1 to 30 mass % with respect to the total mass (100 mass %) of the pretreatment liquid. It is preferable that the content is in the range of 2 to 20 mass % from the viewpoint of suppressing storage stability as a pretreatment liquid and blooming (phenomenon in which a resin and a coagulant are precipitated and crystallized on the image surface).

(Polyolefin Resin)

Examples of the polyolefin resin (O) include modified polyolefins such as polyolefins modified with unsaturated carboxylic acids and/or acid anhydrides.

Examples of the polyolefin include: polyethylene, polypropylene, ethylene-propylene copolymer, random copolymers or block copolymers of ethylene and/or propylene with other comonomers (α-olefin comonomers having 2 or more carbon atoms, preferably 2 to 6 carbon atoms such as 1-butene, 1-pentene, 1-hexene, 1-heptene, 1-octene, and 1-nonene)(e.g., ethylene-propylene-butene copolymers etc.). Moreover, the substances obtained by co-polymerization of two or more types of these other comonomers may be used.

In addition, two or more of these polymers may be used by mixing.

As the modified polyolefin, a polyolefin modified with an unsaturated carboxylic acid and/or an acid anhydride and/or a compound having one or more double bonds per molecule is preferably used.

Examples of an unsaturated carboxylic acid and an acid anhydride include α,β-unsaturated carboxylic acids and their anhydrides. Specific examples thereof are: maleic acid, maleic anhydride, fumaric acid, citraconic acid, citraconic anhydride, mesaconic acid, itaconic acid, itaconic anhydride, aconitic acid, and aconitic acid anhydride.

These may be used alone or in combination of two or more. When two or more are used in combination, the physical properties of the coating often become good.

As the compound having one or more double bonds per one molecule, a (meth)acrylic acid based monomer may be cited. Examples of the (meth)acrylic acid based monomer are: methyl (meth)acrylate, ethyl (meth)acrylate, propyl (meth)acrylate, butyl (meth)acrylate, 2-hydroxyethyl (meth)acrylate, 2-hydroxypropyl (meth)acrylate, 4-hydroxybutyl (meth)acrylate, cyclohexyl (meth)acrylate, tetrahydrofurfuryl (meth)acrylate, isobomyl (meth)acrylate, benzyl (meth)acrylate, 2-hydroxybutyl (meth)acrylate, benzyl (meth)acrylate, glycidyl (meth)acrylate, (meth)acrylic acid, (di) ethylene glycol di(meth)acrylate, di (meth) acrylic acid 1,4-butanediol di(meth)acrylate, 1,6-hexanediol di(meth) acrylate, trimethylolpropane tri(meth)acrylate, glycerol di(meth)acrylate, 2-ethylhexyl (meth)acrylate, lauryl (meth) acrylate, stearyl (meth)acrylate, and stearyl acrylamide. A styrene bases monomer may be also cited. Examples of the styrene bases monomer are: styrene, α-methylstyrene, paramethylstyrene, and chloromethylstyrene. Other usable monomers include vinyl-based monomers such as divinyl benzene, vinyl acetate, and vinyl esters of versatic acid. Here, (meth) acrylic acid indicates acrylic acid and methacrylic acid.

Modification of the polyolefin is carried out by dissolving the polyolefin once in an organic solvent such as toluene or xylene, and in the presence of a radical generator, by reacting α,β-unsaturated carboxylic acid and/or its acid anhydride and/or a compound having one or more double bonds per molecule. Alternatively, in an autoclave which may be reacted in a molten state capable of raising the temperature to the softening temperature or melting point of the polyolefin or higher, or in a uniaxial or biaxial multiaxial extruder, in the presence or absence of a radical generator, modification may be carried out by reacting α,β-unsaturated carboxylic acid and/or its acid anhydride and/or a compound having one or more double bonds per molecule.

Examples of the radical generator used for the modification are: peroxides such as di-tert-butyl perphthalate, tert-butyl hydroperoxide, dicumyl peroxide, benzoyl peroxide, tert-butyl peroxybenzoate, tert-butyl peroxyethyl hexanoate, tert-butyl peroxypivalate, methyl ethyl ketone peroxide, and di-tert-butyl peroxide; and azonitrile compounds such as azobisisobutyronitrile and azobisisopropionitrile. When graft copolymerization is carried out using these peroxides, the amount of peroxide is preferably in the range of 0.1 to 50 mass parts, particularly preferably in the range of 0.5 to 30 mass parts with respect to 100 mass parts of the polyolefin.

The above-mentioned polyolefin resin as an emulsification raw material may be manufactured by a publicly known method, and there is no limitation in particular about each manufacturing method or modification degree.

The polyolefin resin used in the present invention preferably has a weight average molecular weight in the range of 20000 to 100000. When it is 20000 or more, the cohesion of the coating film becomes strong, and the coating film physical properties such as adhesion and solvent resistance (gasohol resistance) are improved. When it is 100000 or less, the solubility with respect to the organic solvent is good, and particle size reduction of the emulsified dispersion is promoted.

The weight average molecular weight is a value measured by gel permeation chromatography (GPC). For example, by using "RID-6A" manufactured by Shimadzu Corporation (column: Tosoh Corporation "TSK-GEL", solvent: tetrahydrofuran (THF) and column temperature: 40° C.), it may be determined from a calibration curve prepared with polystyrene standard samples.

In the present invention, commercially available polyolefin resins may also be used. As resin particles made of resin having polyolefin structure, the following may be used: "AUROREN 150A" (polyolefin resin particles), "SUPER-CHLON E-415" (polypropylene resin particles), and "AUROREN AE-301" (polyolefin resin particles)(made by Nippon Paper Industries Co., Ltd.); and "HARDLEN Na-1001" (made by Toyo Kasei Co., Ltd.).

(Polyurethane Resin)

As a polyurethane resin (U), a substance having a hydrophilic group is used. By introducing a hydrophilic group, the function as an emulsifier for a polyolefin resin may be imparted to the polyurethane resin, and composite resin particles that are an emulsified dispersion of the polyolefin resin may be obtained.

As such a hydrophilic group, a carboxy group (—COOH) and a salt thereof, and a sulfonic acid group (—SO$_3$H) and a salt thereof may be mentioned.

Examples of the salt include alkali metal salts such as sodium salt and potassium salt, and amine salts. Among these, as a hydrophilic group, a carboxy group or a salt thereof is preferable.

The polyurethane-based resin that may be used for the composite resin particles is preferably an aqueous dispersion in which a self-emulsifying polyurethane having a water-soluble functional group is dispersed in the molecule, or an aqueous dispersion of forced emulsification type polyurethane prepared by emulsifying with a strong mechanical shear force using a surfactant. The polyurethane resin in the aqueous dispersion is obtained by the reaction of a polyol with an organic polyisocyanate and a hydrophilic group-containing compound.

Examples of a polyol which may be used for preparation of polyurethane resin aqueous dispersion are: polyester polyol, polyether polyol, polycarbonate polyol, and polyolefin type polyol. Among them, it is preferable to use a polyether polyol or a polycarbonate polyol to form a structure having a carbonate group or an ether group in a urethane resin, because the compatibility with a coagulant is excellent.

Polyester polyols include condensation products made of low molecular weight polyols and polycarboxylic acids. Examples of the low molecular weight polyol are: ethylene glycol, diethylene glycol, triethylene glycol, 1,2-propylene glycol, 1,3-propylene glycol, neopentyl glycol, 1,3-butanediol, 1,4-butanediol, 3-methylpentanediol, hexamethylene glycol, 1,8-octanediol, 2-methyl-1,3-propanediol, bisphenol A, hydrogenated bisphenol A, trimethylolpropane, and cyclohexane dimethanol. Examples of the polycarboxylic acid are: succinic acid, glutaric acid, adipic acid, sebacic acid, phthalic acid, isophthalic acid, terephthalic acid, trimellitic acid, tetrahydrofuranic acid, endomethine tetrahydrofuranic acid, and hexahydrophthalic acid.

As polyether polyols, various polyether polyols may be mentioned. Examples of the polyether polyol are: polyethylene glycol, polypropylene glycol, polyethylene polytetramethylene glycol, polypropylene polytetremethylene glycol, and polytetramethylene glycol.

The polycarbonate polyol may be obtained, for example, by the reaction of a carbonic acid derivative such as diphenyl carbonate, dimethyl carbonate or phosgene with a diol. Examples of the diol are: ethylene glycol, diethylene glycol, triethylene glycol, 1,2-propylene glycol, 1,3-propylene glycol, neopentyl glycol, 1,3-butanediol, 1,4-butanediol, 3-methylpentanediol, hexamethylene glycol, 1,8-octanediol, 2-methyl-1,3-propanediol, bisphenol A, hydrogenated bisphenol A, trimethylolpropane, and cyclohexane dimethanol. Among these, polycarbonate polyols using 1,6-hexanediol are preferable from the viewpoint of weatherability and solvent resistance.

As the organic polyisocyanate, those known in the field of urethane industry may be used. Examples thereof are: aromatic isocyanates such as tolylene diisocyanate (TDI), diphenylmethane diisocyanate (MDI), polymeric (MDI), xylylene diisocyanate (XDI), and tetramethyl xylylene diisocyanate (TMXDI); aliphatic isocyanate such as hexamethylene diisocyanate (HMDI); alicyclic isocyanates such as isophorone diisocyanate (IPDI) and 4,4'-dicyclohexylmethane diisocyanate (hydrogenated MDI, H12 MDI). Among these, it is preferable to use aliphatic isocyanate and/or alicyclic isocyanate. When non-yellowing is required, it is preferable to use HMDI for aliphatic isocyanates, IPDI and H12MDI for alicyclic isocyanates, and XDI and TMXDI for aromatic isocyanates.

These may be used alone or in combination of two or more.

As a hydrophilic group containing compound, the compound which has one or more active hydrogen atoms and the said hydrophilic group in a molecule is mentioned. Examples thereof are: compounds containing a carboxylic group such as 2,2-dimethylol propionic acid, 2,2-dimethylol butanoic acid, 2,2-dimethylol butyric acid, 2,2-dimethylol valeric acid, and glycine, and their derivatives of sodium salts, potassium salts, and amine salts; compounds containing a sulfonic acid group such as taurine (i. e., aminoethyl sulfonic acid), and ethoxypolyethylene glycol sulfonic acid, and their derivatives of sodium salts, potassium salts, and amine salts.

The polyurethane resin according to the present invention may be produced as follows. Firstly, a urethane prepolymer is obtained by mixing a polyol, an organic polyisocyanate and a hydrophilic group-containing compound and reacting them at 30 to 130° C. for 30 minutes to 50 hours by a known method.

The obtained urethane prepolymer is extended and polymerized by a chain extender to obtain a polyurethane resin having a hydrophilic group.

As a chain extender, water and/or an amine compound is preferably used. By using water or an amine as a chain extender, the isocyanate-terminated prepolymer may be efficiently elongated by reacting with a free isocyanate in a short time.

The amines as a chain extender include polyamines. Examples of polyamines are: aliphatic polyamines such as ethylenediamine and triethylenediamine; aromatic polyamines such as meta xylene diamine and toluylene diamine; hydrazine; and polyhydrazino compound such as adipic acid dihydrazide. The amine may contain, together with the above-mentioned polyamine, a monovalent amine such as dibutylamine or methyl ethyl ketoxime as a reaction terminator to such an extent that polymerization is not significantly inhibited.

In the synthesis of the urethane prepolymer, a solvent which is inert to isocyanate and which can dissolve the urethane prepolymer may be used. Examples of the solvent include: dioxane, methyl ethyl ketone, dimethylformamide, tetrahydrofuran, N-methyl-2-pyrrolidone, toluene, and propylene glycol monomethyl ether acetate. It is preferable that these hydrophilic organic solvents used in the reaction step are finally removed.

In addition, in the synthesis of the urethane prepolymer, a catalyst may be added to accelerate the reaction. Examples thereof are: amine catalysts (e.g., triethylamine, N-ethylmorpholine, and triethyldiamine), tin-based catalysts (e.g., dibutyltin dilaurate and dioctyltin dilaurate), and titanium-based catalysts (e.g., tetrabutyl titanate).

The molecular weight of the polyurethane resin is preferably as large as possible by introducing a branched structure or an internal cross-linking structure. The molecular weight is preferably in the range of 50,000 to 10,000,000. When the molecular weight is increased to be insoluble in the solvent, a coating film having excellent weather resistance and water resistance may be obtained.

In the present invention, a commercially available polyurethane resin can also be used, and for example, cationic or nonionic polyurethane resin particles may be preferably used.

Examples of the cationic polyurethane resin particles are: "Superflex 620" and "Superflex 650" ("Superflex" is a registered trademark of Dai-ichi Kogyo Seiyaku Co., Ltd.) and "Permarine UC-20" ("Permarine" is a registered trademark of Sanyo Chemical Industries, Ltd.), and "Parasurf UP-22" made by Ohara Palladium Chemical Co., Ltd.

Examples of the nonionic polyurethane resin particles are: "Superflex 500M" and "Superflex E-200" made by Dai-ichi Kogyo Seiyaku Co., Ltd.

(Preparation of Composite Resin Particles)

As described above, the composite resin particles according to the present invention preferably have a form in which a polyolefin resin is emulsified in the polyurethane resin having the above-mentioned hydrophilic group to form a composite resin.

At the time of emulsification for preparing the composite resin particles, a surfactant may be used as an emulsifier together with the above-mentioned polyurethane resin. That is, the composite resin particles according to the present invention may further contain a surfactant as an emulsifier. The addition of the surfactant may further improve the storage stability of the composite resin particles.

As such a surfactant, it is preferable to use either or both of an anionic surfactant and a nonionic surfactant. It is preferable to blend these anionic surfactant and nonionic surfactant in the range of 1 to 20 mass parts in total of both active agents with respect to 100 mass parts of the total resin mass. When the amount is 20 mass parts or less, water resistance and solvent resistance tend to be excellent.

The value of the blending mass ratio (X/Y) of the anionic surfactant (X) to the nonionic surfactant (Y) is preferably in the range of 100/0 to 50/50. By making the blending quantity of an anionic surfactant in the said range, emulsifying ability and storage stability may be improved more.

(Preparation Method of Composite Resin Particles)

Next, a specific preparation method of composite resin particles will be described.

The composite resin particles described above may be prepared by the following preparation method (I) or (II).

(I) A method in which a polyolefin resin is emulsified in water with a urethane prepolymer having a hydrophilic group, and then an amine as a chain extender or an aqueous solution thereof is added to chain-extend the urethane prepolymer (to obtain a high molecular weight compound).

(II) A method in which a urethane prepolymer having a hydrophilic group is emulsified in water, and further, an amine as a chain extender or an aqueous solution thereof is added to chain-extend the urethane prepolymer to prepare an aqueous dispersion of a polyurethane resin, and then a polyolefin resin is emulsified in the aqueous dispersion of polyurethane resin.

First, an embodiment according to the preparation method (I) will be described.

In this method, first, a resin solution obtained by dissolving a polyolefin resin in a solvent and a solution of a urethane prepolymer having a hydrophilic group are mixed, water is added to the mixture, and the mixture is stirred.

Examples of the solvent include organic solvents such as hexane, isohexane, pentane, cyclohexane, methylcyclohexane, heptane, isooctane, methyl ethyl ketone, xylene, toluene and benzene, and solvents other than water such as carbon dioxide in a supercritical state.

These may be used alone or in combination of two or more.

The emulsification method may be any method such as known forced emulsification method, phase inversion emulsification method, D-phase emulsification method, and gel emulsification method. The equipment used may be, for example, single stirring with a stirring blade, a disper, and a homogenizer. It is also possible to use combined stirring combining these, a sand mill, or a multi-screw extruder. In addition, the surfactant may be mixed with the urethane pre-polymer during the emulsification.

Then, after diluting the above-mentioned emulsion with water, an amine as a chain extender is added, and the remaining isocyanate group of the urethane prepolymer is crosslinked by the chain extender, and the polyurethane resin is polymerized. Thereafter, by distilling off the organic solvent, a composite resin particle dispersion (that is, a dispersion in which water insoluble resin particles are dispersed) containing a polyolefin resin inside the polyurethane resin is obtained.

In the composite resin particle dispersion thus obtained, when the polyolefin resin is a modified polyolefin, the acid component introduced into the polymer may be neutralized by adding a basic substance. By ionizing the same portion by neutralization, the composite resin particle dispersion may further increase the stability because the polymer molecules are elongated and the entire system causes a viscosity increase. In this case, the desired pH may be adjusted by the addition amount of the basic substance.

The basic substance to be used is not particularly limited as long as it can neutralize the acid moiety in the polyolefin resin. Examples thereof are: organic basic substance such as methylamine, ethylamine, propylamine, butylamine, hexylamine, octylamine, ethanolamine, propanolamine, dimethylamine, diethylamine, dipropylamine, dipropylamine, dibutylamine, dihexylamine, dioctylamine, diethanolamine, dipropanolamine, N-methyldiethanolamine, triethylamine, N,N-dimethylethanolamine, 2-dimethylamino-2-methyl-1-propanol, 2-amine-2-methyl-1-propanol, and morpholine; and inorganic basic substance such as an aqueous ammonia solution, sodium hydroxide, potassium hydroxide, sodium carbonate, sodium hydrogencarbonate, ammonium carbonate, and potassium carbonate. When these basic substances are used, the purpose of the present invention may often be achieved more effectively by using two or more types of basic substances in combination. In addition, when an amine is used as a basic substance, a tertiary amine is used so that it may not react with free isocyanate as what is added before making a urethane prepolymer chain-extend. On the other hand, when neutralizing modified polyolefin after chain extension, any of primary, secondary and tertiary amines may be used.

The amount of the basic substance used for neutralization varies depending on the degree of modification of the modified polyolefin, and it is preferably in the range of 0.1 to 10 mass parts with respect to 100 mass parts of the modified polyolefin. When the amount of the basic substance is 0.1 mass parts or more, the pH becomes neutral, and as a result, the storage stability of the composite resin particle dispersion is improved. On the other hand, when the amount of the basic substance is 10 mass parts or less, the storage stability of the composite resin particle dispersion is good, the basicity is not strong, and a large amount of hydrophilic substance is not introduced into the coating film. Thereby, water resistance is improved.

Next, an embodiment according to the preparation method (II) will be described.

In this method, first, water is added to a solution of a urethane prepolymer having a hydrophilic group to emulsify. Then, an amine as a chain extender is added to the obtained emulsion, and the remaining isocyanate group of the urethane prepolymer is cross-linked with the chain extender to prepare an aqueous dispersion of a polymerized polyurethane resin.

Thereafter, a resin solution obtained by dissolving a polyolefin resin in a solvent and the aqueous dispersion of the polyurethane resin having a hydrophilic group obtained above are mixed. Thereby, the polyolefin resin is emulsified in the polyurethane resin having the hydrophilic group. Then, after diluting with water, the organic solvent is distilled off to obtain a composite resin particle dispersion (that is, a dispersion in which water insoluble resin particles are dispersed) containing a polyolefin resin in the inside of the polyurethane resin.

The solvent and the emulsification method in the method (II) are the same as in the method (I). Also in the preparation method (II), a surfactant may be mixed with the above-mentioned polyurethane resin upon emulsification of the polyolefin resin. Furthermore, in the obtained composite resin particle dispersion, the modified polyolefin may be neutralized with a basic substance, as in the above preparation method (I).

The average particle diameter of the composite resin particles is not particularly limited, but it is preferably in the range of 10 to 500 nm, more preferably in the range of 10 to 300 nm, and still more preferably in the range of 10 to 200 nm.

The average particle size may be measured by a commercially available particle size measuring instrument using a dynamic light scattering method or an electrophoresis method. The measurement by the dynamic light scattering method is simple, and the particle diameter range may be measured accurately.

(Other Additives to Composite Resin Particles)

In the composite resin particles according to the present invention, an antioxidant, a light-resistant agent, a plasticizer, a foaming agent, a thickener, a coloring agent, a flame retardant, other aqueous resin and various fillers may be added in an amount of not inhibiting the effect of the present invention.

Antioxidants include, for example, solutions or emulsions of antioxidants such as hindered phenols or semicarbazides.

Examples of the light-resistant agent include solutions or emulsions of light-resistant agents such as hindered amines (HALS), benzophenones, and benzotriazoles.

[Coagulant]

The pretreatment liquid for ink-jet recording of the present invention contains a material that causes pigment particles contained in the ink to coagulate when in contact with the ink-jet ink, that is, the pretreatment liquid contains an aggregating agent. Thereby, the interaction with the ink-jet ink is increased, and the dots of the water-soluble ink may be further fixed.

The coagulant preferably contains any of a cationic resin, a metal chelating agent, a polyvalent metal salt and an organic acid, and more preferably contains any of a polyvalent metal salt and an organic acid.

The cationic resin and the polyvalent metal salt can aggregate an anionic component (usually, a coloring material, specifically a pigment) in the ink-jet ink by salting out.

The organic acid can aggregate anionic components in the ink-jet ink by pH fluctuation.

Examples of the cationic resin include polyallylamine, polyvinylamine, polyethyleneimine and polydiallyldimethyl ammonium chloride.

Examples of the metal chelating agent include metal chelate compounds in which acetylacetone having a nitrogen containing group, methyl acetoacetate, ethyl acetoacetate, ethyl lactate, or methyl salicylate is coordinated with a metal such as aluminum, zinc, cadmium, nickel, cobalt, copper, calcium, barium, titanium, manganese, iron, lead, zirconium, chromium, or tin.

Examples of the polyvalent metal salt include water soluble salts such as calcium salt, magnesium salt, aluminum salt and zinc salt.

The organic acid contained in the pretreatment liquid is capable of aggregating a pigment which may be contained in the ink-jet ink, and the first dissociation constant is preferably 3.5 or less, more preferably in the range of 1.5 to 3.5. Within this range, the liquid gathering (deviation) in the low density portion where the printing rate is low is further prevented, and the beading in the high density portion where the printing rate is high is further improved.

It is preferable to use an organic acid which is not completely neutralized by a base. Neutralization with a base means that the acid group of these acids and another positively charged element or compound (for example, an inorganic compound such as a metal) are ionically bonded. Moreover, "not completely neutralized" means that the acidic group which has not formed the said ionic bond exists among the acidic groups possessed by the organic acid. By using an organic acid having an acidic group which does not form an ionic bond, the compatibility with the composite resin particles having a polyurethane structure contained in the pretreatment liquid is high, and a transparent pretreatment layer may be formed. Thereby, it is assumed d that the color tone of the formed image is brighter than in the case of using a polyvalent metal salt. In addition, the storage stability of the pretreatment liquid may be easily maintained by using an organic acid, and blocking does not easily occur after the pretreatment liquid is applied and dried.

Preferred organic acids from the above viewpoints are: formic acid, acetic acid, propionic acid, isobutyric acid, oxalic acid, fumaric acid, malic acid, citric acid, malonic acid, succinic acid, maleic acid, benzoic acid, 2-pyrrolidone-5-carboxylic acid, lactic acid, acrylic acid and derivatives thereof, methacrylic acid and derivatives thereof, and compounds having a carboxy group including acrylamide and derivatives thereof, sulfonic acid derivatives, phosphoric acid and derivatives thereof.

The content of the organic acid in the pretreatment liquid may be such that the pH of the pretreatment liquid is adjusted to less than the first dissociation constant of the organic acid. By containing the organic acid in an amount such that the pH of the pretreatment liquid is less than the first dissociation constant of the organic acid in the pretreatment liquid, bleeding during high speed printing may be effectively suppressed.

By the organic acid which is a coagulant contained in the pretreatment liquid according to the present invention and the composite resin particles having a polyurethane structure, it is possible to achieve both suppression of bleeding and adhesion of an image layer formed with an ink. Although it is not clear about this reason, it estimates as follows.

In the present invention, by printing the ink-jet ink on the pretreatment liquid layer formed by the pretreatment liquid, the organic acid dissolves and diffuses in the pretreatment liquid layer or the ink to coagulate and fix the pigment. It is believed that bleeding and poor adhesion are suppressed. Therefore, it is preferable to increase the rate of dissolution and diffusion of the organic acid into the ink, particularly as the printing speed is higher. In order to increase the rate of dissolution and diffusion of the organic acid, it is preferable that the resin constituting the pretreatment liquid layer has the property of swelling or dissolving by the ink. On the other hand, it is presumed that when the swelling property or solubility is too high, a uniform film may not be formed and adhesion may not be obtained. In the composite resin particles having a polyurethane structure, the polyol component contained in the structure is appropriately swollen by the organic solvent contained in the ink to promote the diffusion of the organic acid, and a uniform film state is obtained by the hard segment of the isocyanate component. It is believed that by maintaining it, adhesion may be ensured. In addition, it is particularly preferable in view of the storage stability of the pretreatment liquid that the polyol component has a polycarbonate structure or a polyether structure.

The coagulant is preferably present in the range of 0.1 to 20 mass % in the above-mentioned pretreatment liquid in that the anionic component in the ink-jet ink may be effectively aggregated.

The content of the coagulant in an aqueous solution may be measured by a known method. For example, when the coagulant is a polyvalent metal salt, the content may be measured by ICP emission analysis, and when the coagulant is an acid, the content may be measured by high performance liquid chromatography (HPLC).

In the case of using an organic acid, the added amount of the organic acid is preferably an amount to adjust the pH of the pretreatment liquid below neutralization equivalent of anionic component contained in the ink-jet ink. When the anion component is a compound having a carboxy group, the first dissociation constant of the organic acid is preferably 3.5 or less from the viewpoint of making it difficult to cause bleeding of the image.

The application amount of the coagulant constituting the pretreatment liquid according to the present invention is not particularly limited, and may be appropriately adjusted. For example, when the coagulant is a polyvalent metal salt, it is preferable to set the amount of polyvalent metal salt in the range of 0.1 to 20 g/m$^2$. When the coagulant is an organic acid, the amount of the organic acid applied is preferably equal to or less than the neutralization equivalent of the anion component in the water-soluble ink.

[Water, Other Additives]

The water contained in the pretreatment liquid for ink-jet recording according to the present invention is not particularly limited, and it is preferably ion-exchanged water, distilled water, or pure water.

In addition, in the preparation of the pretreatment liquid for ink-jet recording of the present invention, an organic solvent may be contained as a solvent in addition to water. The solvent may be removed at the time of drying of the pretreatment liquid.

In the pretreatment liquid, other components such as a surfactant, a cross-linking agent, an antifungal agent, and a germicide may be appropriately blended, as long as the effects of the present invention are not impaired.

[Preparing Method of Pretreatment Liquid for Ink-Jet Recording]

The preparing method of a pretreatment liquid for ink-jet recording of the present invention contains at least the steps of: emulsifying and dispersing the polyolefin resin and the polyurethane resin described above to forming composite resin particle; mixing the composite resin particles and the aggregating agent to prepare a pretreatment liquid for ink-jet recording.

<<Ink-Jet Recording Method>>

The ink-jet recording method of the present invention uses an ink-jet recording liquid set comprising the pretreatment liquid for ink-jet recording of the present invention and an inkjet ink. In this method, a pretreatment liquid for ink-jet recording is applied on a non-absorptive substrate to form a pretreatment layer, and then an image layer is formed on the pretreatment layer thus formed using an ink-jet ink to perform image recording.

The method for applying the pretreatment liquid of the present invention on a non-absorptive substrate is not particularly limited. In order to obtain good adhesion to the ink applied thereafter, the total application amount of the composite resin particles contained in the pretreatment liquid is preferably 0.3 g/m$^2$ or more to the non-absorptive substrate, and more preferably, 0.8 g/m$^2$ or more. Although the application method of the pretreatment liquid on a non-absorptive substrate is not particularly limited, for example, a wet application method such as a roller application method, a curtain application method, a spray application method, and an ink-jet printing method may be preferably mentioned.

Further, as a method of forming an image layer by applying an ink-jet ink on the pretreatment layer, an ink-jet printing method is mainly applied.

The ink-jet head that can be used in the ink-jet printing method suitable for the present invention may be an on-demand system or a continuous system. Further, as a discharge method, any discharge method such as an electro-mechanical conversion method (for example, single cavity type, double cavity type, bender type, piston type, shear mode type, and shared wall type), or an electro-thermal conversion method (for example, thermal in-jet, and a bubble jet (registered trademark)) may be used.

In particular, an ink-jet head (also referred to as a piezo ink-jet head) using a piezoelectric element as the electro-mechanical conversion element used in the electro-mechanical conversion system is preferable.

In view of the fact that many common substrates are distributed in the form of rolls, it is preferable to use a single-pass ink-jet recording method. The effect of the present invention is particularly remarkable in the single-pass ink-jet recording method. That is, when using the single-pass ink-jet recording method, high-definition images may be formed.

In the single-pass inkjet recording method, when the substrate passes under one ink-jet head unit, ink droplets are applied to all the pixels on which dots are to be formed in one pass.

It is preferable to use a line head type ink-jet head as a means for achieving the single pass type ink-jet recording method.

The line head type ink-jet head refers to an ink-jet head having a length equal to or greater than the width of the printing area. As the line head type ink-jet head, one head may be used that is equal to or more than the width of the printing range, or a plurality of heads may be combined to be equal to or more than the width of the printing range.

Further, it is also preferable to arrange a plurality of heads side by side so that the nozzles of each other are arranged in a staggered arrangement to increase the resolution of the heads as a whole.

The transport speed of the non-absorptive substrate may be set, for example, in the range of 1 to 120 m/min. The faster the transport speed, the faster the image forming speed. According to the present invention, the occurrence of bleeding is further suppressed even at a very high linear velocity in the range of 50 to 120 m/min, which is applicable in the single-pass inkjet image forming method, and an image having high adhesion may be obtained.

After the pretreatment liquid and the ink are applied to the non-absorptive substrate to produce a print, the print may be dried. Drying may be performed by a known method such as infrared lamp drying, hot air drying, back heat drying, or reduced pressure drying. From the viewpoint of further improving the drying efficiency, it is preferable to dry the printed matter by combining two or more of these drying methods.

In the following, a preferable example of the ink-jet recording method and the ink-jet recording apparatus of the present invention is shown.

FIG. 1 is a schematic view indicating an example of the configuration of an ink-jet recording apparatus having a pretreatment liquid applying means applicable to the ink-jet recording method of the present invention. However, the present invention is not limited to this. For example, in the ink-jet recording apparatus 1 having a pretreatment liquid applying device illustrated in FIG. 1, the first drying unit 14 may be omitted.

The ink-jet recording apparatus 1 having a pretreatment liquid applying device mainly includes a precoat application unit 10 to form a pretreatment layer C and an IJ printing unit 20 to form an image layer R. In the precoat application unit 10, the pretreatment layer C is formed on the non-absorptive substrate F, and the image layer R is formed by the IJ printing unit 20.

Specifically, the pretreatment liquid droplets 13 ejected from the nozzles 12 by the roll coater 11 are applied onto the non-absorptive substrate F drawn out from the delivery roller 30, and the pretreatment layer C is formed. Subsequently, the pretreatment layer C is dried by the first drying unit 14. Although an example of a roll coater system was shown as a formation method of a pre-treatment layer C in FIG. 1, another method of applying as an ink droplet by using an ink-jet head may also be used suitably.

Next, ink droplets 22 are discharged from the ink-jet head 21 onto the pretreatment layer C to form the image layer R, and after drying by the second drying unit 23, the pretreatment layer C and the image layer are taken up by the winding roller 40. The non-absorptive substrate F in which the pretreatment layer C and the image layer R were formed is wound up.

<<Printed Matter>>

The printed matter of the present invention contains: a pretreatment layer which is formed using the pretreatment liquid for ink-jet recording of the present invention on a non-absorbing substrate; and an image layer which is formed using an ink-jet recording liquid ink on the pretreatment layer.

Figure 2:
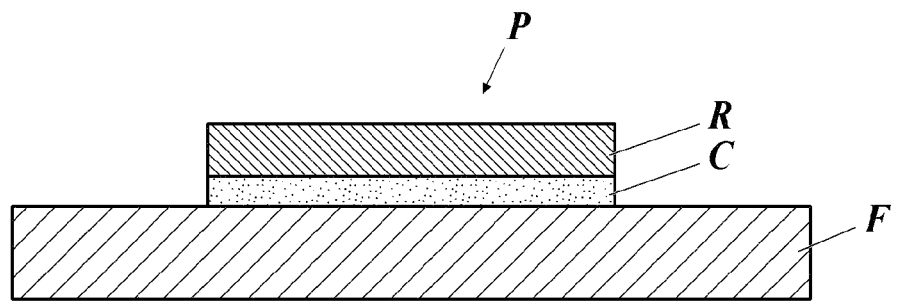
FIG. 2 is a schematic sectional drawing which indicates an example of a structure of the printed matter of the present invention.

FIG. 2 is a schematic cross-sectional view indicating an example of a configuration of a printed matter of the present invention.

As illustrated in FIG. 2, the printed matter P is obtained by discharging the pretreatment liquid according to the present invention from an ink-jet head on a non-absorptive substrate F to form a pretreatment layer C, the ink is discharged from an ink-jet head at a position where the pretreatment layer C is fixed, and the ink is fixed to form an image layer R.

The above configuration indicates the minimum configuration, and another functional layer may be formed between the recording substrate and the pretreatment layer. In addition, a non-absorptive film substrate may be bonded as an upper layer of the image layer, for example, through a laminating adhesive layer. At least the configuration in which the pretreatment layer and the image layer are in contact is essential.

<Non-Absorptive Substrate>

As a recording medium applied to the formation of the printed matter and the ink-jet recording method of the present invention, a non-absorptive substrate is used.

The non-absorptive substrate in the present invention is a substrate that does not absorb ink. In the present invention, a non-absorptive recording medium is defined as having an ink transfer amount of less than 0.1 ml/mm$^2$, substantially, an ink transfer amount of 0 ml/mm$^2$, which is measured according to the liquid absorption test method (Bristow method) of paper or paper board (J. TAPPI pulp and paper test method No. 51-87).

As a non-absorptive substrate, a non-absorbing film is particularly preferable. By applying the pretreatment liquid for ink-jet recording of the present invention to such a non-absorbing substrate, the ink-jet ink may be sufficiently pinned to form a high-quality image with less bleeding.

Examples of the non-absorptive film include known plastic films. Examples of a plastic film include: a polyester film such as polyethylene terephthalate (PET), a polyethylene (PE) film including a high density polyethylene film and a low density polyethylene film, a polypropylene (PP) film, a polyamide films such as nylon (NY), a polystyrene film, an ethylene-vinyl acetate copolymer (EVA) film, a polyvinyl chloride (PVC) film, a polyvinyl alcohol (PVA) film, a polyacrylic acid (PAA) film, a polycarbonate film, a polyacrylonitrile film, and a biodegradable film such as a polylactic acid film.

Moreover, in order to provide a gas barrier property, a moisture proof property, and an odor retention property, the film may be coated with polyvinylidene chloride on a single surface or on both surfaces of the film, and the film may be vapor-deposited with metal oxide. In addition, the film may be subjected to antifogging treatment. In addition, the film may be subjected to corona discharge and ozone treatment.

The non-water absorbing film may be either an un-stretched film or a stretched film.

The film may also be a multi-layered substrate in which a layer such as PVA coat is provided on the surface of an absorptive substrate such as paper to make the area to be recorded non-absorptive.

The thickness of the above-described film is preferably in the range of 10 to 120 nm.

Although the embodiments of the present invention have been described and illustrated in detail, the disclosed embodiments are made for purpose of illustration and example only and not limitation. The scope of the present invention should be interpreted by terms of the appended claims.

EXAMPLES

Hereinafter, the present invention will be specifically described by referring to examples, but the present invention is not limited thereto. In addition, although the term "part" or "%" is used in examples, unless otherwise indicated, it represents "mass part" or "mass %."

<<Preparation of Pretreatment Liquid>>

[Preparation of Pretreatment Liquid 1]

After sequentially adding each additive indicated below with stirring, the mixture was filtered with a 5.0 μm filter to obtain a pretreatment liquid 1. There was no substantial change in composition before and after filtration.

Composite resin particles: HUX-2520 (Urethane resin, manufactured by ADEKA Co., Ltd.): 15.0 mass parts Coagulant: Zirconium acetate (IV): 5.0 mass parts Ion-exchanged water: An amount that makes the total amount of 100 mass parts In the present Example, the compounding amounts (mass parts) of the water-insoluble resin particles, the surfactant and the coagulant in the pretreatment liquid composition are values converted to solid content.

[Preparation of Pretreatment Liquids 2 to 23]

Pretreatment liquids 2 to 23 were prepared in the same manner as preparation of the above pretreatment liquid 1 except that the type and amount of resin particles and the type of coagulant were changed to the combinations in Table I.

Table I indicates the composition of each pretreatment liquid.

U1C: Polyester polyurethane resin (U)/polyolefin resin (O)=95/5

U1D: Polyester polyurethane resin (U)/polyolefin resin (O)=90/10

U1E: Polyester polyurethane resin (U)/polyolefin resin (O)=80/20

U1F: Polyester polyurethane resin (U)/polyolefin resin (O)=70/30

U1G: Polyester polyurethane resin (U)/polyolefin resin (O)=60/40

U1H: Polyester polyurethane resin (U)/polyolefin resin (O)=50/50

U1J: Polyester polyurethane resin (U)/polyolefin resin (O)=40/60

U2: Polycarbonate polyurethane resin (U)/polyolefin resin (O)=50/50

U3: Polyether polyurethane resin (U)/polyolefin resin (O)=50/50

TABLE I

| Pretreatment liquid No. | Resin particles 1 Kind | Content (Mass parts) | Resin particles 2 Kind | Content (Mass parts) | Coagulant Kind | Content (Mass parts) | Water Content (Mass parts) |
|---|---|---|---|---|---|---|---|
| 1 | HUX-2520(*) | 14.0 | — | — | Zirconium acetate | 5.0 | 81.0 |
| 2 | HUX-2520(*) | 14.0 | — | — | PAS-1 | 5.0 | 81.0 |
| 3 | U1A(U/O = 97/3)(*) | 14.0 | — | — | Zirconium acetate | 5.0 | 81.0 |
| 4 | U1B(U/O = 35/65)(*) | 14.0 | — | — | PAS-1 | 5.0 | 81.0 |
| 5 | U1C(U/O = 95/5)(*) | 14.0 | — | — | Zirconium acetate | 5.0 | 81.0 |
| 6 | U1D(U/O = 90/10)(*) | 14.0 | — | — | PAS-1 | 5.0 | 81.0 |
| 7 | U1E(U/O = 80/20)(*) | 14.0 | — | — | Zirconium acetate | 5.0 | 81.0 |
| 8 | U1F(U/O = 70/30)(*) | 14.0 | — | — | PAS-1 | 5.0 | 81.0 |
| 9 | U1G(U/O = 60/40)(*) | 14.0 | — | — | Zirconium acetate | 5.0 | 81.0 |
| 10 | U1H(U/O = 50/50)(*) | 14.0 | — | — | PAS-1 | 5.0 | 81.0 |
| 11 | U1J(U/O = 40/60)(*) | 14.0 | — | — | Zirconium acetate | 5.0 | 81.0 |
| 12 | U2(U/O = 50/50)(*) | 14.0 | — | — | PAS-1 | 5.0 | 81.0 |
| 13 | U3(U/O = 50/50)(*) | 14.0 | — | — | Zirconium acetate | 5.0 | 81.0 |
| 14 | ACRIT WEM-506C(*) | 14.0 | — | — | PAS-1 | 5.0 | 81.0 |
| 15 | U3(U/O = 50/50)(*) | 14.0 | — | — | Malonic acid | 5.0 | 81.0 |
| 16 | U2(U/O = 50/50)(*) | 14.0 | — | — | Calcium acetate | 5.0 | 81.0 |
| 17 | ACRIT WEM-506C(*) | 14.0 | — | — | Malonic acid | 5.0 | 81.0 |
| 18 | PES Resin A-645GEX | 14.0 | — | — | PAS-1 | 5.0 | 81.0 |
| 19 | SUPERFLEX 650 | 14.0 | — | — | Zirconium acetate | 5.0 | 81.0 |
| 20 | SUPERCHLON E-415 | 14.0 | — | — | PAS-1 | 5.0 | 81.0 |
| 21 | SUPERFLEX 650 | 7.0 | SUPERCHLON E-415 | 7.0 | Zirconium acetate | 5.0 | 81.0 |
| 22 | HUX-2520(*) | 14.0 | — | — | — | — | 86.0 |
| 23 | ACRIT WEM-506C(*) | 14.0 | — | — | — | — | 86.0 |

(*)Composite resin particles

The details of each additive listed in the above Table 1 in abbreviated form are as follows.

[Resin Particles]

(Single Component Resin Particles)

PES Resin A-645GEX: Polyester resin, manufactured by UNITICA Ltd.

SUPERFLEX 650: Polyurethane resin, manufactured by Daiichi Kogyo Co., Ltd.

SUPERCHLON E-415: Polyolefin resin, manufactured by Nippon Paper Industries Co., Ltd.

(Composite Resin Particles)

HUX2520: Polyurethane resin/polyacrylic resin, manufactured by ADEKA Co., Ltd.

ACRIT WEM-506: Polycarbonate polyurethane resin/polyolefin resin=50/50, manufactured by Taisei Fine Co., Ltd.

U1A: Polyester polyurethane resin (U)/polyolefin resin (O)=97/3

U1B: Polyester polyurethane resin (U)/polyolefin resin (O)=35/65

The composite resin particles U1A to U1J, U2 and U3 were synthesized according to the following method.

(Preparation of Composite Resin Particles U1A)

[1] Preparation of urethane prepolymer solution U1

Into a four-necked flask equipped with a stirrer, reflux condenser, thermometer and nitrogen bubbler, 182.0 mass parts of polyester polyol (trade name Teslac 2461, manufactured by Hitachi Chemical Co., Ltd.), 22.0 mass parts of polyethylene glycol (PEG, molecular weight 600, trade name PEG 600, Daiichi Kogyo Seiyaku Co., Ltd.), 5.6 mass parts of trimethylol propane, 43.8 mass parts of N-methyl-N,N-diethanolamine, 204 mass parts of 4,4'-dicyclohexylmethane diisocyanate, and 216 mass parts of methyl ethyl ketone (MEK) were loaded (added amount of tertiary amine 9.6 mass %; and added amount of PEG: 4.8 mass %). The reaction was carried out while maintaining the reaction mixture at 75° C. to obtain a urethane prepolymer solution U1.

[2] Preparation of Composite Resin Particle

Into a four-necked flask equipped with a stirrer, reflux condenser, thermometer and nitrogen bubbler, 30.0 mass parts of polyolefin resin (trade name: AUROREN 150S, manufactured by Nippon Paper Industries Co., Ltd.), 240.0 mass parts of methylcyclohexane, and 48.0 mass parts of methyl ethyl ketone were loaded. The temperature of the mixture was raised to 80° C. and dissolved by heating. After dissolution, the internal temperature was kept at 40° C., and 194 mass parts of a urethane prepolymer solution U1 (nonvolatile content: about 50%) was added and mixed. 58.0 mass parts of water was added to this solution and emulsified using a homogenizer. Thereafter, 260 mass parts of water was gradually added and diluted, and an aqueous solution in which 1.0 mass part of ethylene diamine and 12 mass parts of water were mixed was gradually added thereto, and the mixture was stirred for 1 hour to perform polymerization. The solvent was removed under reduced pressure at 50° C. to obtain a dispersion liquid of composite resin particles U1A having a nonvolatile content (solid content as particles) of about 30 mass %, and having a ratio of polyurethane resin (U)/polyolefin resin (O)=97/3.

(Preparation of Composite Resin Particle Dispersions U1B to U1J)

Composite resin particles U1B to U1J each having a nonvolatile content (solid content as particles) of about 30 mass % were prepared in the same manner as preparation of the composite resin particle dispersion U1A except that the value of the content weight ratio (U/O) of the solid content of the above urethane prepolymer solution U1 and the polyolefin resin (O) was changed as described in Table I.

(Preparation of Composite Resin Particles U2)

A composite resin particle U2 was prepared in the same manner as preparation of the composite resin particles U1H, except that a urethane prepolymer solution U2 indicated below was used in place of the urethane prepolymer solution U1.

<Preparation of Urethane Polymer Solution U2>

Into a four-necked flask equipped with a stirrer, reflux condenser, thermometer and nitrogen bubbler, 182.0 mass parts of polycarbonate polyol (molecular weight 1000, trade name NIPOLAN 981, Nippon Polyurethane Industry Co., Ltd.), 22.0 mass parts of polyethylene glycol (PEG, molecular weight 600, trade name PEG 600, Daiichi Kogyo Seiyaku Co., Ltd.), 5.6 mass parts of trimethylol propane, 43.8 mass parts of N-methyl-N,N-diethanolamine, 204 mass parts of 4,4'-dicyclohexylmethane diisocyanate, and 216 mass parts of methyl ethyl ketone (MEK) were loaded (added amount of tertiary amine: 9.6 mass %; and added amount of PEG: 4.8 mass %). The reaction was carried out while maintaining the reaction mixture at 75° C. to obtain a urethane prepolymer solution U2.

(Preparation of Composite Resin Particles U3)

A composite resin particle U3 was prepared in the same manner as preparation of the composite resin particles U1H, except that a urethane prepolymer solution U3 indicated below was used in place of the urethane prepolymer solution U1.

<Preparation of Urethane Polymer Solution U3>

Into a four-necked flask equipped with a stirrer, reflux condenser, thermometer and nitrogen bubbler, 182.0 mass parts of polyether polyol (PolyTHF 2000, made by BASF Corporation), 22.0 mass parts of polyethylene glycol (PEG, molecular weight 600, trade name PEG 600, Daiichi Kogyo Seiyaku Co., Ltd.), 5.6 mass parts of trimethylol propane, 43.8 mass parts of N-methyl-N,N-diethanolamine, 204 mass parts of 4,4'-dicyclohexylmethane diisocyanate, and 216 mass parts of methyl ethyl ketone (MEK) were loaded (added amount of tertiary amine: 9.6 mass %; and added amount of PEG: 4.8 mass %). The reaction was carried out while maintaining the reaction mixture at 75° C. to obtain a urethane prepolymer solution U3.

(Coagulant)

PAS-1: Cationic polymer, NITTOBO Medical Co., Ltd.

<<Preparation of Ink>>

[Preparation of Ink 1]

(1) Preparation of Pigment Dispersion Liquid

A mixture of 18 mass % of pigment (Pigment Blue 15:3), 31.5 mass % of pigment dispersant (an acrylic dispersant "Joncryl 918" having a carboxyl group neutralized with sodium hydroxide, acid value of 75 mgKOH/g, solid content 20 mass %, made by BASF Corporation), 20 mass % of ethylene glycol, and ion-exchanged water (residual amount: an amount that makes the total amount of 100 mass parts) was pre-mixed. Then, the mixture was dispersed with a sand grinder filled with 0.5 mm zirconia beads in 50% volume fraction. Thus, a pigment dispersion liquid with a pigment content of 18.0 mass % was prepared.

The average particle diameter of the pigment particles contained in this pigment dispersion liquid was 109 nm. In addition, the measurement of the average particle diameter was performed by "Zetasizer 1000HS" manufactured by Marl Balloon Co., Ltd.

(2) Preparation of Ink

While stirring the pigment dispersion liquid prepared above, each additive indicated below was added one by one so that pigment solid content became 5.0 mass parts, and the ink composition was prepared. Thereafter, the mixture was filtered through a 0.8 μm filter to obtain an ink 1. There was no substantial change in composition before and after filtration.

Pigment solid content: 5.0 mass parts

Dispersant composition: 1.5 mass parts

Propylene glycol: 5.0 mass parts

MMB (3-methoxy-3-methyl-1-butanol): 40.0 mass parts

Surfactant Orphin E1010 (manufactured by Nisshin Chemical Co., Ltd.):

1.0 mass part

Ion-exchanged water: An amount that makes the total amount of 100 mass parts

[Preparation of Inks 2 to 15]

Inks 2 to 15 were prepared in the same manner as preparation of the ink 1, except that the type and amount of the solvent for the ink and the type of surfactant were changed to the combinations described in Table II.

TABLE II

| Ink No. | Pigment Content (Mass parts) | Dispersant Content (Mass parts) | Ink solvent 1 Kind | Content (Mass parts) | Ink solvent 2 Kind | Content (Mass parts) | Surfactant Kind | Content (Mass parts) | Water Content (Mass parts) |
|---|---|---|---|---|---|---|---|---|---|
| 1 | 5.0 | 1.5 | Propylene glycol | 5.0 | MMB | 40.0 | E-1010 | 1.0 | 47.5 |
| 2 | 5.0 | 1.5 | Propylene glycol | 5.0 | MMB/MB | 20.0/20.0 | E-1010 | 1.0 | 47.5 |
| 3 | 5.0 | 1.5 | Ethylene glycol | 5.0 | MB | 40.0 | E-1010 | 1.0 | 47.5 |
| 4 | 5.0 | 1.5 | Ethylene glycol | 5.0 | MB | 10.0 | E-1010 | 1.0 | 77.5 |
| 5 | 5.0 | 1.5 | Propylene glycol | 5.0 | MMB | 20.0 | E-1010 | 1.0 | 67.5 |
| 6 | 5.0 | 1.5 | Ethylene glycol | 5.0 | MB | 30.0 | E-1010 | 1.0 | 57.5 |
| 7 | 5.0 | 1.5 | Propylene glycol | 5.0 | MMB | 30.0 | E-1010 | 1.0 | 57.5 |
| 8 | 5.0 | 1.5 | Propylene glycol | 5.0 | MMB | 30.0 | Surfactant S-7 | 1.0 | 57.5 |
| 9 | 5.0 | 1.5 | Ethylene glycol | 5.0 | Propylene glycol | 30.0 | E-1010 | 1.0 | 57.5 |
| 10 | 5.0 | 1.5 | Ethylene glycol | 5.0 | DGME | 30.0 | E-1010 | 1.0 | 57.5 |
| 11 | 5.0 | 1.5 | Ethylene glycol | 5.0 | 1,2-Hexanediol | 30.0 | E-1010 | 1.0 | 57.5 |
| 12 | 5.0 | 1.5 | Ethylene glycol | 5.0 | 1,4-Butanediol | 30.0 | E-1010 | 1.0 | 57.5 |
| 13 | 5.0 | 1.5 | Ethylene glycol | 5.0 | 1-Butanol | 30.0 | E-1010 | 1.0 | 57.5 |

MB: 3-Methoxy-1-butanol
MMB: 3-Methoxy-3-methyl-1-butanol
DGME: Diethylene glycol monoethyl ether
Surfactant S-7: Silicone surfactant Details of the additives listed in Table II in abbreviated form are given below.
(Ink Solvent)
  MB: 3-Methoxy-1-butanol
  MMB: 3-Methoxy-3-methyl-1-butanol
  DGME: Diethylene glycol monoethyl ether
(Surfactant)
  Surfactant S-7 used in the preparation of the ink 8 was synthesized by the following method.
(Synthetic Example of Surfactant S-7)
  In a five-necked flask equipped with a stirrer, reflux condenser, dropping funnel, thermometer and nitrogen bubbler were loaded 750 mass parts of allylated polyether (UNIOX PKA-5011, manufactured by NOF Corporation), and 0.01 mass parts of $H_2Pt_{16}\cdot 6H_2O$ hexachloroplatinum (IV) acid hexahydrate (manufactured by Tokyo Chemical Industry Co., Ltd.). Nitrogen gas substitution was performed. The reaction vessel was heated to 70° C. and 220 mass parts of heptamethyltrisiloxane (manufactured by Aldrich Co.) was dropped over 1 hour, and then the reaction vessel was heated to 110° C. and reacted for 4 hours. After the reaction, unreacted material was distilled off under a reduced pressure to obtain silicone surfactant S-7, which is a target silicone surfactant. The obtained silicone surfactant S-7 is a silicone surfactant corresponding to R=a hydrogen atom, X=an alkylene group having 3 carbon atoms, m=12, and n=3 in Formula (1).
<<Production of Printed Matter>>
[Production of Printed Matter 1]
  An ink recording liquid set 1 was constituted by the pretreatment liquid 1 and the ink 1 prepared as described above, and a printed matter 1 was produced according to the following method.
[Formation of Pretreatment Layer]
  The following two types of film substrates were used as non-absorptive substrates. The above prepared pretreatment liquid 1 was coated to each substrate using a bar coater # 10 under the condition that the resin solid content after drying is 1.5 g/m², and then dried at 60° C. for 5 minutes. Thus, a pretreatment layer 1 was formed on each non-absorptive substrate.
(Non-Absorptive Substrate)
  PET: Polyethylene terephthalate film (E5102, made by Toyobo Co., Ld.)
  OPP: Stretched polypropylene film (FOS-AQ, made by Futamura Chemical Co., Ltd.)
[Formation of Image Layer]
  Two independently driven ink-jet heads (360 dpi, ejection amount: 14 pL) manufactured by Konica Minolta Co., Ltd. were arranged side by side so that the nozzles were staggered, and a head module capable of printing an image of 720 dpi×720 dpi by a single pass method was prepared. Each ink-jet head was loaded with an ink 1. Two such head modules were prepared and arranged in parallel along the transport direction of the transport stage for transporting a non-absorptive substrate. Each head module was installed so as to intersect with the transport direction (the movement axis of the transport stage). In this manner, when the non-absorptive substrate passed once, the printing rate of the ink 1 can be 200%, that is, the ink coverage (22.5 ml/m²) for two colors can be printed.
  The non-absorptive substrate was adhered on the conveyance stage so that the pretreatment layer 1 was on top, the conveyance was performed at a speed of 60 m/min, and an image layer was formed by a single pass method by ejecting the ink 1 when the non-absorptive substrate passed under the head. As a test image, an image was printed in which a character having a size of 6 points was arranged as an outline character in a 7 cm square solid image having an ink coverage of 22.5 ml/m².
  After forming an image layer by the ink-jet method, the printed matter was placed on a hot plate and dried at 70° C. for 15 minutes to obtain a printed matter 1 having a pretreatment layer 1 and an ink layer 1.
[Preparation of Printed Matters 2 to 32]
  Printed matters 2 to 32 were prepared in the same manner as preparation of the printed matter 1 except that ink recording liquid sets 2 to 32 prepared by changing the pretreatment liquid and the ink to the combinations described in Table III were used.
<<Evaluation of Printed Matter>>
  Each of the following evaluations was performed on the produced printed matter (non-absorptive substrate: PET, OPP).
[Evaluation of Image Quality]
  With respect to the image layers (substrate: PET, OPP) of the produced printed materials, the state of solid image filling and ink bleeding was visually observed, and the image quality was evaluated according to the following criteria.

◎: The printed matters using PET and OPP have no white streaks in the formed solid image, and the solid image is uniformly embedded. In addition, the 6-points outlined characters shows good repeatability without collapse and bleeding of details.

◯: The printed matters using PET and OPP have one or two white streaks in the formed solid image, and the solid image is uniformly embedded. In addition, the 6-points outlined characters shows good repeatability without collapse and bleeding of details.

Δ: In either of the printed matters using PET and OPP, 3 to 5 white streaks are observed in the formed solid image, and a partial collapse of the 6-points outlined characters is observed to cause weak crushing. It is an acceptable quality ×: In the printed matters using PET and OPP, a large number of distinctive white streaks is observed in the formed solid image in both cases, and the occurrence of a clear collapse is observed over the details of the 6-points outlined characters. It is a practically problematic quality.

[Evaluation of Adhesiveness: PET and OPP]

Against the solid image (non-absorptive substrate: PET, OPP) formed above, according to JIS K 5600, a cut was given by a cutter at intervals of 1 mm on the solid image surface to produce a 5×5 grid (number of grids: 25). After pasting cellophane adhesive tape on a grid pattern, it was pulled in the direction of 45 degree and the number of grid lines in which the solid image layer has peeled off was counted. The adhesiveness at the level of using PET and OPP as the non-absorptive substrate was evaluated according to the following criteria.

◎: No peeling off of the grid by the tape peeling test occurred at all.

◯: The number of squares removed in the grid by the tape peeling test is 1 or more and 3 or less, which is a good quality.

Δ: The number of squares removed in the grid by the tape peeling test is 4 or more and 6 or less, which is practically acceptable quality.

×: The number of squares removed in the grid by the grid peeling test is 7 or more, which is a quality that poses a practical problem.

[Evaluation of Quick Drying Property]

The solid image formed using PET as the non-absorbent substrate was dried at 25° C. for 15 minutes, 30 minutes, and 60 minutes as a drying time. Subsequently, a filter paper was pressed against the solid image portion after drying for each drying time, and the presence or absence of ink transfer to the filter paper was visually observed, and a quick drying property was evaluated according to the following criteria.

◎: No ink transfer to filter paper is observed under drying conditions of 25° C. for 15 minutes.

◯: Ink transfer to filter paper is observed under drying conditions of 25° C. for 15 minutes. However, no ink transfer to filter paper is observed under drying conditions of 25° C. for 30 minutes.

Δ: Ink transfer to filter paper is observed under drying conditions of 25° C. for 30 minutes. However, no ink transfer to filter paper is observed under drying conditions of 25° C. for 60 minutes.

×: Ink transfer to filter paper is observed even under drying conditions of 25° C. for 60 minutes.

[Evaluation of Water Resistance]

The solid image formed on PET as the non-absorbent substrate was stored at 40° C. for 25% RH, for 3 days, and then cut into a 10 cm×1 cm strip so that the solid part would be the cut end face to obtain a test piece. The test piece was boiled in a pressure cooker for 30 minutes, the condition of the test piece after boiling was visually confirmed, and the water resistance of the image with each ink was evaluated based on the following criteria.

◎: No peeling is observed at the edge of the test piece and the solid image.

◯: Although some fine peeling occurs inside the solid image layer of the test piece, no peeling occurs at all on the cut end face.

Δ: Although weak peeling occurs on the cut end face of the test piece, it is a practically acceptable quality.

×: Most of the solid image is completely peeled off from the PET substrate.

TABLE III

| Printed matter No. | Constitution of ink recording liquid set | | Evaluation result | | | | | |
| | Pretreatment liquid No. | Ink No. | Image quality | Image fixability PET | Image fixability OPP | Quick drying | Water resistance | Remarks |
|---|---|---|---|---|---|---|---|---|
| 1 | 1 | 1 | ◯ | Δ | ◯ | Δ | Δ | Present invention |
| 2 | 2 | 2 | ◯ | Δ | ◯ | Δ | Δ | Present invention |
| 3 | 3 | 1 | ◯ | ◎ | ◯ | Δ | Δ | Present invention |
| 4 | 4 | 3 | ◯ | ◯ | ◎ | Δ | Δ | Present invention |
| 5 | 5 | 1 | ◯ | ◎ | ◎ | ◯ | Δ | Present invention |
| 6 | 6 | 3 | ◯ | ◎ | ◎ | ◯ | Δ | Present invention |
| 7 | 7 | 1 | ◯ | ◎ | ◎ | ◯ | Δ | Present invention |
| 8 | 8 | 3 | ◯ | ◎ | ◎ | ◯ | Δ | Present invention |
| 9 | 9 | 1 | ◯ | ◎ | ◎ | ◯ | Δ | Present invention |
| 10 | 10 | 3 | ◯ | ◎ | ◎ | ◯ | Δ | Present invention |
| 11 | 11 | 1 | ◯ | ◎ | ◎ | ◯ | Δ | Present invention |
| 12 | 12 | 3 | ◯ | ◎ | ◎ | ◯ | ◯ | Present invention |
| 13 | 13 | 1 | ◯ | ◎ | ◎ | ◯ | ◯ | Present invention |
| 14 | 14 | 3 | ◯ | ◎ | ◎ | ◯ | ◯ | Present invention |
| 15 | 12 | 4 | ◯ | ◎ | ◎ | ◎ | ◯ | Present invention |
| 16 | 13 | 5 | ◯ | ◎ | ◎ | ◎ | ◯ | Present invention |
| 17 | 12 | 6 | ◯ | ◎ | ◎ | ◎ | ◯ | Present invention |
| 18 | 15 | 7 | ◯ | ◎ | ◎ | ◎ | ◎ | Present invention |
| 19 | 16 | 6 | ◯ | ◎ | ◎ | ◎ | ◎ | Present invention |

TABLE III-continued

| | Constitution of ink | | | Evaluation result | | | | |
|---|---|---|---|---|---|---|---|---|
| Printed | recording liquid set | | | Image | | | | |
| matter | Pretreatment | Ink | Image | fixability | | Quick | Water | |
| No. | No. | liquid No. | No. | quality | PET | OPP | drying | resistance | Remarks |
| 20 | 20 | 15 | 8 | ◎ | ◎ | ◎ | ◎ | ◎ | Present invention |
| 21 | 21 | 17 | 8 | ◎ | ◎ | ◎ | ◎ | ◎ | Present invention |
| 22 | 22 | 18 | 6 | ○ | ○ | X | X | X | Comparative example |
| 23 | 23 | 19 | 7 | ○ | ○ | X | X | X | Comparative example |
| 24 | 24 | 20 | 6 | ○ | X | ○ | X | X | Comparative example |
| 25 | 25 | 21 | 7 | ○ | Δ | Δ | X | X | Comparative example |
| 26 | 26 | 22 | 6 | X | Δ | Δ | Δ | Δ | Comparative example |
| 27 | 27 | 23 | 7 | X | Δ | Δ | Δ | Δ | Comparative example |
| 28 | 28 | 14 | 9 | Δ | Δ | Δ | X | X | Comparative example |
| 29 | 29 | 1 | 10 | Δ | Δ | Δ | X | X | Comparative example |
| 30 | 30 | 14 | 11 | Δ | Δ | Δ | X | X | Comparative example |
| 31 | 31 | 1 | 12 | Δ | Δ | Δ | X | X | Comparative example |
| 32 | 32 | 14 | 13 | Δ | Δ | Δ | ○ | X | Comparative example |

The following became clear from the results described in Table III. The printed material of the present invention produced using the ink-jet recording liquid set of the present invention is superior in the quality of the formed ink image to the comparative example, even when the image formation is carried out by high speed printing. The printed matter of the present invention has excellent fixability (adhesion) with ink images formed with non-absorptive substrates such as polyethylene terephthalate film and stretched polypropylene film, excellent quick drying (drying property) and excellent water resistance of the formed ink images. It was found that high quality images are formed on non-absorptive substrates.

What is claimed is:

1. An ink-jet recording liquid set comprising a pretreatment liquid for ink-jet recording and an ink-jet ink,
    wherein the pretreatment liquid for ink-jet recording includes: composite resin particles in which a polyolefin resin is contained in a polyurethane resin; a coagulant; and water,
    the ink-jet ink contains: a pigment; water; and 3-methoxy-1-butanol or 3-methoxy-3-methy-1-butanol, and
    a mass ratio (U/O) of the polyurethane resin (U) to the polyolefin resin (O) in the composite resin particles is in the range of 40/60 to 95/5.

2. The ink-jet recording liquid set described in claim 1, wherein the composite resin particles contain the polyolefin resin emulsified in the polyurethane resin.

3. The ink-jet recording liquid set described in claim 1, wherein a polyol component in the polyurethane resin contained in the composite resin particles has a carbonate group or an ether bond in the molecule.

4. The ink-jet recording liquid set described in claim 1, wherein a content of 3-methoxy-1-butanol or 3-methoxy-3-methyl-butanol is in the range of 5.0 to 30 mass % with respect to a total mass of the ink-jet ink.

5. The ink-jet recording liquid set described in claim 1, wherein the coagulant is a polyvalent metal salt or an organic acid.

6. A method of preparing the pretreatment liquid for ink-jet recording that constitutes the ink-jet recording liquid set described in claim 1, comprising the steps of:
    emulsifying and dispersing the polyolefin resin and the polyurethane resin to form the composite resin particles; and
    mixing the composite resin particles with the coagulant.

7. A printed matter having a pretreatment layer and an image layer on a non-absorptive substrate formed with the ink-jet recording liquid set described in claim 1.

8. An ink-jet recording method for forming an image using the pretreatment liquid for ink-jet recording and the ink-jet ink contained in the ink-jet recording liquid set described in claim 1, the method comprising the steps of:
    applying the pretreatment liquid for ink-jet recording on a non-absorptive substrate to form a pretreatment layer; and
    forming an image layer using the ink-jet ink on the formed pretreatment layer.

9. An ink-jet recording liquid set comprising a pretreatment liquid for ink-jet recording and an ink-jet ink,
    wherein the pretreatment liquid for ink-jet recording includes: composite resin particles in which a polyolefin resin is contained in a polyurethane resin; a coagulant; and water,
    the ink-jet ink contains: a pigment; water; and 3-methoxy-1-butanol or 3-methoxy-3-methy-1-butanol, and
    the ink-jet ink further contains a silicone surfactant having a structure represented by Formula (1) as a surfactant,

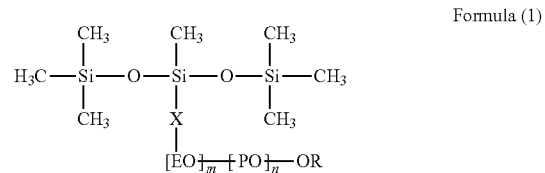

Formula (1)

wherein R represents a hydrogen atom or a hydrocarbon group having 1 to 4 carbon atoms, X represents an alkylene group having to 6 carbon atoms, and X may have a branched structure, EO represents a repeating unit structure of polyethylene oxide, PO represents a repeating unit structure of polypropylene oxide, $[EO]_m$ and $[PO]_n$ may have any order, n and m each represent a number of repeating unit structure, m is an integer of 2 to 50, and n is an integer of 0 to 20.

10. The ink-jet recording liquid set described in claim 9, wherein the composite resin particles contain the polyolefin resin emulsified in the polyurethane resin.

11. The ink-jet recording liquid set described in claim 9, wherein a mass ratio (U/O) of the polyurethane resin (U) to the polyolefin resin (O) in the composite resin particles is in the range of 40/60 to 95/5.

12. The ink-jet recording liquid set described in claim 9, wherein a polyol component in the polyurethane resin contained in the composite resin particles has a carbonate group or an ether bond in the molecule.

13. The ink-jet recording liquid set described in claim 9, wherein a content of 3-methoxy-1-butanol or 3-methoxy-3-methyl-butanol is in the range of 5.0 to 30 mass % with respect to a total mass of the ink-jet ink.

14. The ink-jet recording liquid set described in claim 9, wherein the coagulant is a polyvalent metal salt or an organic acid.

15. A method of preparing the pretreatment liquid for ink-jet recording that constitutes the ink-jet recording liquid set described in claim 9, comprising the steps of:

emulsifying and dispersing the polyolefin resin and the polyurethane resin to form the composite resin particles; and mixing the composite resin particles with the coagulant.

16. A printed matter having a pretreatment layer and an image layer on a non-absorptive substrate formed with the ink-jet recording liquid set described in claim 9.

17. An ink-jet recording method for forming an image using the pretreatment liquid for ink-jet recording and the ink-jet ink contained in the ink-jet recording liquid set described in claim 9, the method comprising the steps of:

applying the pretreatment liquid for ink-jet recording on a non-absorptive substrate to form a pretreatment layer; and forming an image layer using the ink-jet ink on the formed pretreatment layer.

* * * * *